(12) United States Patent
Mizutani et al.

(10) Patent No.: US 7,710,603 B2
(45) Date of Patent: May 4, 2010

(54) IMAGE FORMING APPARATUS AND IMAGE FORMING METHOD

(75) Inventors: Toshiyuki Mizutani, Tokyo (JP); Kenichirou Hiramoto, Tokyo (JP)

(73) Assignee: Konica Minolta IJ Technologies, Inc., Tokyo (JP)

( * ) Notice: Subject to any disclaimer, the term of this patent is extended or adjusted under 35 U.S.C. 154(b) by 871 days.

(21) Appl. No.: 11/470,788

(22) Filed: Sep. 7, 2006

(65) Prior Publication Data

US 2007/0064272 A1    Mar. 22, 2007

(30) Foreign Application Priority Data

Sep. 22, 2005   (JP) .............................. 2005-275463

(51) Int. Cl.
*H04N 1/405* (2006.01)

(52) U.S. Cl. .................................... 358/3.01; 358/3.21

(58) Field of Classification Search .................. 358/1.9, 358/2.1, 3.01, 3.11–3.12, 3.21; 382/237
See application file for complete search history.

(56) References Cited

U.S. PATENT DOCUMENTS 6,031,627 A * 2/2000 Kakutani .................... 358/1.9

FOREIGN PATENT DOCUMENTS

| JP | 2000125121 | 4/2000 |
|----|------------|--------|
| JP | 3208777 | 7/2001 |
| JP | 3292104 | 3/2002 |
| JP | 200380682 | 3/2003 |
| JP | 2003080682 A * | 3/2003 |

* cited by examiner

*Primary Examiner*—Thomas D Lee
*Assistant Examiner*—Stephen M Brinich
(74) *Attorney, Agent, or Firm*—Lucas & Mercanti, LLP

(57) ABSTRACT

Image forming apparatus 1 capable of forming dots of types in quantity of α (integer satisfying α≧2) wherein there are provided, target pixel selection means 2 that selects a target pixel, recording rate acquisition means 3 that acquires a recording rate total value of dots in two types among dots of types in quantity of α and acquires a recording rate of a dot on one side among dots in two types, first quantization means 4 that conducts quantization based on the recording rate total value and determines recording of dots in quantity of i (integer satisfying 0≦i≦2) on the target pixel and second quantization means 5 that determines types of dots to be recorded on the target pixel based on i representing the number of dots to be recorded on the target pixel determined by the first quantization means and on the recording rate of the dot on one side.

38 Claims, 19 Drawing Sheets

□ LIGHT DOT
▨ DARK DOT
■ DARK AND LIGHT DOTS

FIG. 14

| 151 | 330 | 266 | 350 | 162 | 319 | 223 | 342 | 302 |
|-----|-----|-----|-----|-----|-----|-----|-----|-----|
| 385 | 253 | 200 | 285 | 394 | 236 | 370 | 180 | 26  |
| 188 | 290 | 380 | 242 | 191 | 336 | 175 | 281 | 40  |
| 273 | 357 | 166 | 344 | 269 | 296 | 257 | 347 | 21  |
| 327 | 225 | 307 | 213 | 373 | 155 | 385 | 197 | 325 |
| 58  | 392 | 198 | 325 | 246 | 316 | 235 | 313 | 168 |
| 313 | 234 | 348 | 172 | 403 | 220 | 367 | 210 | 357 |
| 180 | 378 | 265 | 293 | 193 | 341 | 162 | 275 | 294 |

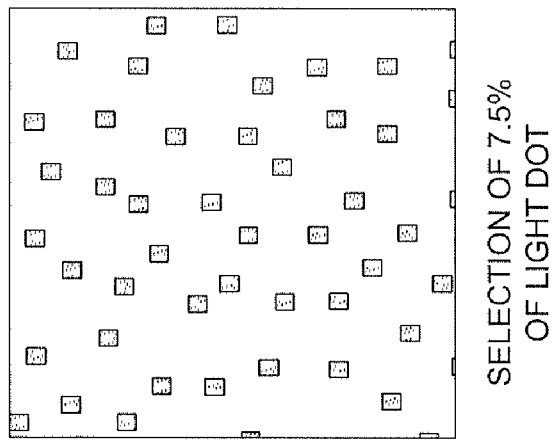
FIG. 19(a)
SELECTION OF 7.5% OF LIGHT DOT
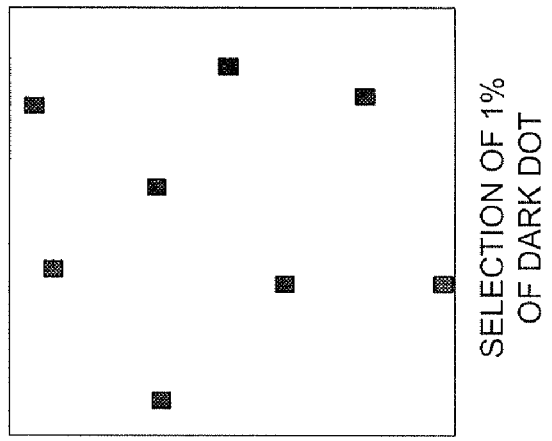
FIG. 19(b)
SELECTION OF 1% OF DARK DOT
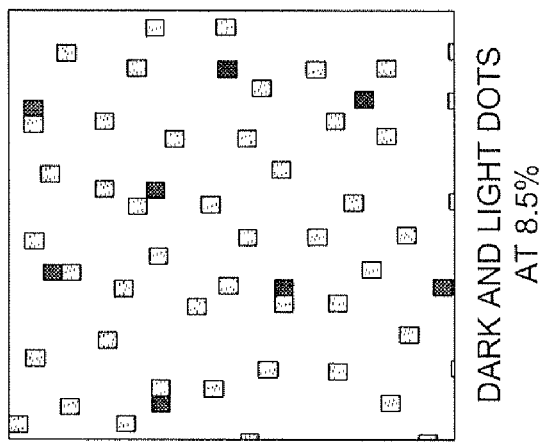
FIG. 19(c)
DARK AND LIGHT DOTS AT 8.5%

IMAGE FORMING APPARATUS AND IMAGE FORMING METHOD

TECHNICAL FIELD

The present invention relates to an image forming apparatus and an image forming method, and in particular, to an image forming apparatus and an image forming method all being able to form a plurality of types of dots.

BACKGROUND

As a printing apparatus for printing images from a personal computer, there have been a printer employing three types of ink each being different in terms of color such as cyan (C), magenta (M) and yellow (Y), and a printer employing four types colors wherein black (K) ink is added to the aforesaid three types of ink. In these printers, images are formed through on-off operations of each dot having its hue obtained by half-toning.

In recent years, on the other hand, for obtaining output images having higher image quality, there is observed the spread of a printer wherein dots with plural gradation levels for a single hue are formed for printing, by using ink having different concentrations (for example, dark color ink and light color ink) in the same hue or by making a dot diameter of ink to be different each other.

However, even when dots having plural gradation levels with a single hue can be formed as stated above, there is sometimes an occasion where an image is rather worsened if the dots are not arranged properly. For example, for obtaining output images having dark dots (dots having higher concentration per unit area) and light dots (dots having lower concentration per unit area), when halftone processing of binarization is conducted for each dot, and when respective pixel values are summed up afterwards, and those where both are superposed do not show excellent dispersion totally, although dot dispersion for light dots only (see FIG. 19(a) and dot dispersion for dark dots only (see FIG. 19(b) are in the excellent condition, thus, final graininess is worsened considerably (see FIG. 19(c).

Therefore, there have been proposed various methods concerning a method of arrangement of plural types of dots each having a different concentration per unit area (for example, see Patent Documents 1-4). Among them, in Patent Document 1, 100% or more of light dots are dotted, and when the difference of concentration from dark dots becomes small, the dark dots are started to be put in.

In Patent Document 2, an occupancy rate of large dots is calculated from input values to arrange dots and then, 3 level halftone processing of input values is carried out, and any of large dot, small dot and no dot is allotted.

Further, in Patent Document 3, input values are dissolved into the dot rate between dark dots and light dots, and for improving dispersion of dark dots, halftone processing is carried out first for dark dot, and then, halftone processing is carried out with a total value of dark dot and light dot, so that arrangement of dark dots may be determined.

Further, in Patent Document 4, input values are dissolved into the dot occupancy rate between dark dots and light dots, and dark dots are selected from the dot occupancy rate of dark dots by the use of blue noise dither, while, light dots are selected from the total value of the dot occupancy rate between dark dots and light dots further by the use of blue noise dither.

(Patent Document 1) Unexamined Japanese Patent Application Publication No. 2003-80682

(Patent Document 2) Japanese Patent Publication No. 3580150

(Patent Document 3) Japanese Patent Publication No. 3208777

(Patent Document 4) Japanese Patent Publication No. 3292104

However, the aforesaid Patent Document 1 has a problem that an amount of ink cannot be limited, and types of usable sheets are limited.

The Patent Document 2 has a problem that excellent images are not obtained in respective dot dispersions, especially in dispersion of remarkable large dots, and graininess is worsened accordingly.

In the Patent Document 3, granulation feeling is rather increased especially when weight of a dot is considered, because dispersion of light dots is disturbed by dark dots, which is a problem.

In the Patent Document 4, under the condition where the sum of the recording rates for two types of dots exceeds 100%, a dither matrix wherein sizes of threshold values of dither matrix used for judgment of forming of dots of a type on one side are replaced is compared with the recording rate of the type on the other side, thus, on the portion where two types of dots are superposed each other, the two types of dots are super posed on a random basis without being controlled, resulting in deterioration of graininess, which is a problem.

An objective of the invention therefore is to provide an image processing apparatus and an image processing method wherein dot dispersion can be carried out excellently when forming the images on a recording medium by the use of dots in a plurality of types.

SUMMARY

It is therefore an object of the present invention to provide an image forming apparatus capable of forming dots of types in quantity of α, wherein there are provided, target pixel selection device, recording rate acquisition device that acquires a recording rate total value of dots in two types among dots of types in quantity of α and acquires a recording rate of a dot on one side among dots in two types, first quantization device that conducts quantization based on the recording rate total value and determines recording of dots in quantity of "i" on the target pixel and second quantization device that determines types of dots to be recorded on the target pixel based on i representing the number of dots to be recorded on the target pixel determined by the first quantization device and on the recording rate of the dot on one side.

BRIEF DESCRIPTION OF THE DRAWINGS

FIG. 14 is a diagram showing an example of a threshold value matrix.

FIG. 19(a) is an image diagram showing a result of halftone processing of a light dot in the conventional way. FIG. 19(b) is an image diagram showing a result of halftone processing of a dark dot in the conventional way. FIG. 19 (c) is an image diagram showing a result of overlapping of FIG. 19(a) and FIG. 19(b) in the conventional way.

DESCRIPTION OF THE PREFERRED EMBODIMENT

Figure 1:
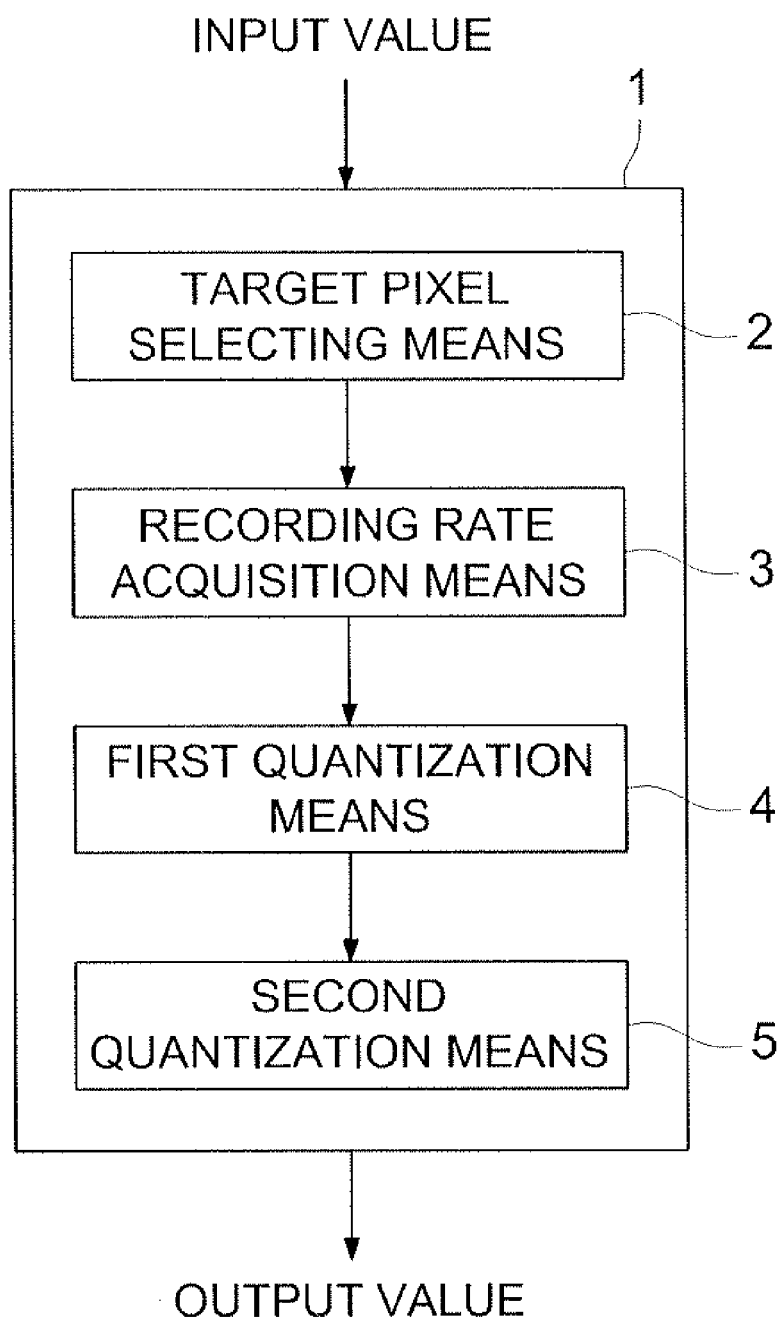
FIG. 1 is a block diagram showing a schematic structure of the first embodiment relating to an image forming apparatus of the invention.

The invention described in Item 1 is an image forming apparatus capable of forming dots in $\alpha$ types ($\alpha$ is an integer satisfying $\alpha \geq 2$), having therein a target pixel selection means (device) that selects a target pixel, a recording rate acquisition means (device) that acquires a recording rate total value of dots in $\beta$ types ($\beta$ is an integer satisfying $2 \leq \beta \leq \alpha$) among dots in $\alpha$ types and a recording rate for each of dots in ($\beta-1$) types, the first quantization means (device) that conducts quantization based on the aforesaid recording rate total value and determines recording of dots in quantity of i (i is an integer satisfying $0 \leq i \leq \beta$) on the aforesaid target pixel, a target dot selection means (device) that selects a target dot which has not been selected from dots in X types (initial value of X is X=$\beta$) the second quantization means (device) that determines whether to record the target dot on the target pixel or not, based on the number i for dots to be recorded on the target pixel determined by the first quantization means (device) and on the recording rate of the target dot, and a subtraction means (device) that calculates X by subtracting the number of target dots selected from the dots in $\beta$ types, wherein, processes by the aforesaid target dot selection means (device), the second quantization means (device) and a subtraction means (device) are repeated until X is reduced to zero in the subtraction means (device).

In the invention described in Item 1, there are provided a target pixel selection means that selects a target pixel, a recording rate acquisition means that acquires a recording rate total value of dots in $\beta$ types ($\beta$ is an integer satisfying $2 \leq \beta \leq \alpha$) among dots in $\alpha$ types and a recording rate for each of dots in ($\beta-1$) types, the first quantization means that conducts quantization based on the aforesaid recording rate total value and determines recording of dots in quantity of i (i is an integer satisfying $0 \leq I \leq \beta$) on the aforesaid target pixel, a target dot selection means that selects a target dot which has not been selected from dots in X types (initial value of X is X=$\beta$), the second quantization means that determines whether to record the target dot on the target pixel or not, based on the number i for dots to be recorded on the target pixel determined by the first quantization means and on the recording rate of the target dot, and a subtraction means that calculates X by subtracting the number of target dots selected from the dots in $\beta$ types, in the image forming apparatus capable of forming dots in $\alpha$ types ($\alpha$ is an integer satisfying $\alpha \geq 2$), as stated above, and processes by the aforesaid target dot selection means, the second quantization means and a subtraction means are repeated until X is reduced to zero at the aforesaid subtraction means. Therefore, granulation feeling caused by random overlapping between arranged dots can be reduced. Further, when the total printing rate for these dots exceeds 100%, in other words, even under the condition that dots are overlapped, the overlapped dots can be selected under the excellent dispersion, thus, visual granulation feeling can be controlled. Further, since a common halftone means is used for both an occasion where the total printing rate of dots exceeds 100% and an occasion where the total printing rate of dots does not exceed 100%, a boundary line between 100% or more and 100% or less is not observed even when dots of one type only are observed, resulting in acquisition of smooth images which are free from pseudo-contours.

The invention described in Item 2 is the image forming apparatus according to the Item 1, wherein the dots in $\beta$ types are those each being different in terms of density.

The invention described in Item 3 is the image forming apparatus according to the Item 1 or Item 2, wherein the dots in $\beta$ types are those each being different in terms of a dot diameter on a recording medium.

The invention described in Item 4 is the image forming apparatus according to any one of the Item 1-Item 3, wherein the dots in $\beta$ types are those each being different in terms of the hue.

In the invention, its effects are exhibited, even when the aforesaid dots in $\beta$ types are those each being different in terms of density, or when the aforesaid dots in $\beta$ types are those each being different in terms of a dot diameter on a recording medium, or when the aforesaid dots in $\beta$ types are those each being different in terms of hue, as described in the Items 1, 2 and 3. Namely, it is possible to control uneven density between dots each being different in terms of density or in terms of a dot diameter, and it is further possible to control uneven color difference between dots each being different in terms of hue.

The invention described in Item 5 is the image forming apparatus according to any one of the Item 1-Item 4, wherein the aforesaid target dot selection means selects, beginning with dots having higher visual influence.

In the invention described in Item 5, the target dot selection means selects, beginning with dots having higher visual influence. Therefore, selection is made, beginning with dots having higher visual influence, in other words, beginning with remarkable dots, thus, dispersibility of the dots can be secured, and images with less granulation feeling can be obtained.

The invention described in Item 6 is represented by an image forming apparatus capable of forming dots in α types (α is an integer satisfying α≧2), wherein there are provided a target pixel selection means (device) that selects a target pixel, a recording rate acquisition means (device) that acquires a recording rate total value of dots in 2 types among dots in α types and a recording rate for either one of the two types dots, the first quantization means (device) that conducts quantization based on the aforesaid recording rate total value and determines recording of dots in quantity of i (i is an integer satisfying 0≦i≦2) on the aforesaid target pixel, and the second quantization means (device) that determines a type of the dot to be recorded on the aforesaid target pixel, based on quantity i of dots recorded on the target pixel determined by the first quantization means (device) and on the recording rate of the aforesaid dot on one side.

In the invention described in Item 6, an image forming apparatus capable of forming dots in α types (α is an integer satisfying α≧2) has therein a target pixel selection means that selects a target pixel, a recording rate acquisition means that acquires a recording rate total value of dots in 2 types among dots in α types and a recording rate for either one of the two types dots, the first quantization means that conducts quantization based on the aforesaid recording rate total value and determines recording of dots in quantity of i (i is an integer satisfying 0≦i≦2) on the aforesaid target pixel, and the second quantization means that determines a type of the dot to be recorded on the aforesaid target pixel, based on quantity i of dots recorded on the target pixel determined by the first quantization means and on the recording rate of the aforesaid dot on one side. Therefore, granulation feeling caused by random overlapping between arranged dots can be reduced. Further, when the total printing rate for these dots exceeds 100%, in other words, even under the condition that dots are overlapped, the overlapped dots can be selected under the excellent dispersion, thus, visual granulation feeling can be controlled. Further, since a common halftone means is used for both an occasion where the total printing rate of dots exceeds 100% and an occasion where the total printing rate of dots does not exceed 100%, a boundary line between 100% or more and 100% or less is not observed even when dots of one type only are observed, resulting in acquisition of smooth images which are free from pseudo-contours. Further, when conducting quantization for two types of dots among dots in α types as in the Item 6, it is possible to conduct quantization through more simple processing than in the occasion of conducting quantization for three types of dots among dots in α types, thus, processing speed can be improved, and a load of processing for the apparatus can be reduced.

The invention described in Item 7 is the image forming apparatus according to Item 6, wherein the aforesaid dots in two types are those which are different in terms of density each other.

The invention described in Item 8 is the image forming apparatus according to Item 6, wherein the aforesaid dots in two types are those which are different in terms of a dot diameter on a recording medium each other.

The invention described in Item 9 is the image forming apparatus according to Item 6, wherein the aforesaid dots in two types are those which are different in terms of a dot diameter on a recording medium each other.

In the invention, its effects are exhibited, even when the aforesaid dots in 2 types are those which are different in terms of density each other, or those which are different in terms of a dot diameter on a recording medium each other, or those which are different in terms of hue, as described in the Items 7, 8 and 9. Namely, it is possible to control uneven density between dots each being different in terms of density or in terms of a dot diameter, and it is further possible to control uneven color difference between dots each being different in terms of hue.

The invention described in Item 10 is the image forming apparatus according to any one of Items 1-9, wherein the aforesaid first quantization means quantizes in a dithering method in which the recording rate total value on the target pixel is compared with a dither matrix value corresponding to the target pixel.

In the invention described in Item 10, the aforesaid first quantization means quantizes in a dithering method in which the recording rate total value on the target pixel is compared with a dither matrix value corresponding to the target pixel, whereby the dithering method makes it possible for the first quantization means to conduct processing at high speed.

The invention described in Item 11 is the image forming apparatus according to any one of Items 1-9, wherein the aforesaid first quantization means conducts quantization through an error diffusion method wherein an error caused by the first quantization on the processed peripheral pixel is reflected on the recording rate total value corresponding to the target value, and thereby diffuses errors caused by the aforesaid quantization on unprocessed peripheral pixels.

In the invention described in Item 11, the aforesaid first quantization means conducts quantization through an error diffusion method wherein an error caused by the first quantization on the processed peripheral pixel is reflected on the recording rate total value corresponding to the target value, and thereby diffuses errors caused by the aforesaid quantization on unprocessed peripheral pixels, thus, dispersion of total dots is made to be excellent by using the error diffusion method for the processing by the first quantization means.

The invention described in Item 12 is the image forming apparatus according to any one of Items 1-11, wherein the aforesaid second quantization means conducts quantization through an error diffusion method wherein an error caused by the second quantization on the processed peripheral pixel is reflected on the recording rate of the corresponding target dot, and thereby diffuses errors caused by the aforesaid quantization on unprocessed peripheral pixels.

In the invention described in Item 12, the aforesaid second quantization means conducts quantization through an error diffusion method wherein an error caused by the second quantization on the processed peripheral pixel is reflected on the recording rate of the corresponding target dot, and thereby diffuses errors caused by the aforesaid quantization on unprocessed peripheral pixels, thus, it becomes possible to select a dot position under the condition of excellent dispersion, by conducting processing by the second quantization means through the error diffusion method.

The invention described in Item 13 is the image forming apparatus according to any one of Items 1-12, wherein the recording rate acquisition means transforms an input pixel value by using a prescribed degradation table to acquire the aforesaid recording rate total value and the recording rate of not less than 1.

In this case, when recording an input pixel value with a single hue by the use of plural dots, for example, it is possible either to prepare recording rates of respective dots based on input pixel values by using a degradation table, to calculate the recording rate total value based on respective recording rates, or to preserve recording rate total value in the degradation table.

The invention described in Item 14 is the image forming apparatus according to any one of Items 1-13, wherein respective recording rates corresponding to pixel values are preserved in advance in the aforesaid recording rate acquisition means.

The invention described in Item 15 is an image forming method capable of forming dots in α types (α is an integer satisfying α≧2), having therein a target pixel selection process that selects a target pixel, a recording rate acquisition process that acquires a recording rate total value of dots in β types (β is an integer satisfying 2≦β≦α) among dots in α types and a recording rate for each of dots in (β−1) types, the first quantization process that conducts quantization based on the aforesaid recording rate total value and determines recording of dots in quantity of i (i is an integer satisfying 0≦i≦β) on the aforesaid target pixel, a target dot selection process that selects a target dot which has not been selected from dots in X types (initial value of X is X=β) the second quantization process that determines whether to record the target dot on the target pixel or not, based on the number i for dots to be recorded on the target pixel determined by the first quantization means and on the recording rate of the target dot, and a subtraction process that calculates X by subtracting the number of target dots selected from the dots in β types, wherein, processes by the aforesaid target dot selection process, the second quantization process and a subtraction process are repeated until X is reduced to zero in the subtraction process.

In the invention described in Item 15, there are provided a target pixel selection process that selects a target pixel, a recording rate acquisition process that acquires a recording rate total value of dots in β types (β is an integer satisfying 2≦β≦α) among dots in α types and a recording rate for each of dots in (β−1) types, the first quantization process that conducts quantization based on the aforesaid recording rate total value and determines recording of dots in quantity of i (i is an integer satisfying 0≦i≦β) on the aforesaid target pixel, a target dot selection process that selects a target dot which has not been selected from dots in X types (initial value of X is X=β), the second quantization process that determines whether to record the target dot on the target pixel or not, based on the number i for dots to be recorded on the target pixel determined by the first quantization means and on the recording rate of the target dot, and a subtraction means that calculates X by subtracting the number of target dots selected from the dots in β types, in the image forming method capable of forming dots in α types (α is an integer satisfying α≧2), as stated above, and processes by the aforesaid target dot selection process, the second quantization process and a subtraction process are repeated until X is reduced to zero at the aforesaid subtraction process. Therefore, granulation feeling caused by random overlapping between arranged dots can be reduced. Further, when the total printing rate for these dots exceeds 100%, in other words, even under the condition that dots are overlapped, the overlapped dots can be selected under the excellent dispersion, thus, visual granulation feeling can be controlled. Further, since a common halftone means is used for both an occasion where the total printing rate of dots exceeds 100% and an occasion where the total printing rate of dots does not exceed 100%, a boundary line between 100% or more and 100% or less is not observed even when dots of one type only are observed, resulting in acquisition of smooth images which are free from pseudo-contours.

The invention described in Item 16 is the image forming method according to the Item 15, wherein the dots in β types are those each being different in terms of density.

The invention described in Item 17 is the image forming method according to the Item 15 or Item 16, wherein the dots in β types are those each being different in terms of a dot diameter on a recording medium.

The invention described in Item 18 is the image forming method according to any one of the Item 15-Item 17, wherein the dots in β types are those each being different in terms of the hue.

In the invention, its effects are exhibited, even when the aforesaid dots in β types are those each being different in terms of density, or when the aforesaid dots in β types are those each being different in terms of a dot diameter on a recording medium, or when the aforesaid dots in β types are those each being different in terms of hue, as described in the Items 16, 17 and 18. Namely, it is possible to control uneven density between dots each being different in terms of density or in terms of a dot diameter, and it is further possible to control uneven color difference between dots each being different in terms of hue.

The invention described in Item 19 is the image forming method according to any one of the Item 15-Item 18, wherein target dots are selected, beginning with dots having higher visual influence, in the aforesaid target dot selection process.

In the invention described in Item 19, target dots are selected, beginning with dots having higher visual influence, in the aforesaid target dot selection process. Therefore, it is possible to secure dispersibility of the dots and to obtain images with less granulation feeling, by selecting beginning with dots having higher visual influence, in other words, with remarkable dots.

The invention described in Item 6 is represented by an image forming method capable of forming dots in α types (α is an integer satisfying α≧2), wherein there are provided a target pixel selection process that selects a target pixel, a recording rate acquisition process that acquires a recording rate total value of dots in 2 types among dots in α types and a recording rate for either one of the two types dots, the first quantization process that conducts quantization based on the aforesaid recording rate total value and determines recording of dots in quantity of i (i is an integer satisfying 0≦i≦2) on the aforesaid target pixel, and the second quantization process that determines a type of the dot to be recorded on the aforesaid target pixel, based on the number of dots i to be recorded on the target pixel determined in the first quantization process and on the recording rate of the aforesaid dot on one side.

In the invention described in Item 20, an image forming method capable of forming dots in α types (α is an integer satisfying a α≧2) has therein a target pixel selection process that selects a target pixel, a recording rate acquisition process that acquires a recording rate total value of dots in 2 types among dots in α types and a recording rate for either one of the two types dots, the first quantization process that conducts quantization based on the aforesaid recording rate total value and determines recording of dots in quantity of i (i is an integer satisfying 0≦i≦2) on the aforesaid target pixel, and the second quantization process that determines a type of the dot to be recorded on the aforesaid target pixel, based on quantity i of dots recorded on the target pixel determined in the first quantization process and on the recording rate of the aforesaid dot on one side. Therefore, granulation feeling caused by random overlapping between arranged dots can be reduced. Further, when the total printing rate for these dots exceeds 100%, in other words, even under the condition that dots are overlapped, the overlapped dots can be selected under the excellent dispersion, thus, visual granulation feeling can be controlled. Further, since a common halftone means is used for both an occasion where the total printing rate of dots exceeds 100% and an occasion where the total printing rate of dots does not exceed 100%, a boundary line between 100% or more and 100% or less is not observed even when dots of one type only are observed, resulting in acquisition of smooth images which are free from pseudo-contours. Further, when conducting quantization for two types of dots among dots in $\alpha$ types as in the Item 20, it is possible to conduct quantization through more simple processing than in the occasion of conducting quantization for three types of dots among dots in $\alpha$ types, thus, processing speed can be improved, and a load of processing for the apparatus can be reduced.

The invention described in Item 21 is the image forming method according to Item 20, wherein the aforesaid dots in two types are those which are different in terms of density each other.

The invention described in Item 22 is the image forming method according to Item 20, wherein the aforesaid dots in two types are those which are different in terms of a dot diameter on a recording medium each other.

The invention described in Item 23 is the image forming method according to Item 20, wherein the aforesaid dots in two types are those which are different in terms of the hue each other.

In the invention, its effects are exhibited, even when the aforesaid dots in 2 types are those which are different in terms of density each other, or those which are different in terms of a dot diameter on a recording medium each other, or those which are different in terms of hue, as described in the Items 21, 22 and 23. Namely, it is possible to control uneven density between dots each being different in terms of density or in terms of a dot diameter, and it is further possible to control uneven color difference between dots each being different in terms of hue.

The invention described in Item 24 is the image forming method according to any one of Items 15-23, wherein the aforesaid first quantization process quantizes in a dithering method in which the recording rate total value on the target pixel is compared with a dither matrix value corresponding to the target pixel.

In the invention described in Item 24, the aforesaid first quantization process quantizes in a dithering method in which the recording rate total value on the target pixel is compared with a dither matrix value corresponding to the target pixel, whereby the dithering method makes it possible for the first quantization process to conduct processing at high speed.

The invention described in Item 25 is the image forming method according to any one of Items 15-23, wherein the aforesaid first quantization process conducts quantization through an error diffusion method wherein an error caused by the first quantization on the processed peripheral pixel is reflected on the recording rate total value corresponding to the target pixel, and thereby diffuses errors caused by the aforesaid quantization on unprocessed peripheral pixels.

In the invention described in Item 25, the aforesaid first quantization process conducts quantization through an error diffusion method wherein an error caused by the first quantization on the processed peripheral pixel is reflected on the recording rate total value corresponding to the target pixel, and thereby diffuses errors caused by the aforesaid quantization on unprocessed peripheral pixels, thus, dispersion of total dots is made to be excellent by using the error diffusion method for the processing by the first quantization process.

The invention described in Item 26 is the image forming method according to any one of Items 15-25, wherein the aforesaid second quantization process conducts quantization through an error diffusion method wherein an error caused by the second quantization on the processed peripheral pixel is reflected on the recording rate of the corresponding target dot, and thereby diffuses errors caused by the aforesaid quantization on unprocessed peripheral pixels.

In the invention described in Item 26, the aforesaid second quantization process conducts quantization through an error diffusion method wherein an error caused by the second quantization on the processed peripheral pixel is reflected on the recording rate of the corresponding target dot, and thereby diffuses errors caused by the aforesaid quantization on unprocessed peripheral pixels, thus, it becomes possible to select a dot position under the condition of excellent dispersion, by conducting processing by the second quantization process through the error diffusion method.

The invention described in Item 27 is the image forming method according to any one of Items 15-26, wherein an input pixel value is transformed by using a prescribed degradation table in the recording rate acquisition process, to acquire the aforesaid recording rate total value and the recording rate of not less than 1.

In this case, when recording an input pixel value with a single hue by the use of plural dots, for example, it is possible either to prepare recording rates of respective dots based on input pixel values by using a degradation table, to calculate the recording rate total value based on respective recording rates, or to preserve recording rate total value in the degradation table.

The invention described in Item 28 is the image forming method according to any one of Items 15-27, wherein respective recording rates corresponding to pixel values are preserved in advance in the aforesaid recording rate acquisition process.

The invention described in Item 29 is an image forming program wherein, there are realized a target pixel selection function that selects a target pixel, a recording rate acquisition function that acquires a recording rate total value of dots in $\beta$ types ($\beta$ is an integer satisfying $2 \leq \beta \leq \alpha$) among dots in $\alpha$ types and a recording rate for each of dots in ($\beta-1$) types, the first quantization function that conducts quantization based on the aforesaid recording rate total value and determines recording of dots in quantity of i (i is an integer satisfying $0 \leq i \leq \beta$) on the aforesaid target pixel, a target dot selection function that selects a target dot which has not been selected from dots in X types (initial value of X is X=$\beta$) the second quantization function that determines whether to record the target dot on the target pixel or not, based on the number i for dots to be recorded on the target pixel determined by the first quantization means and on the recording rate of the target dot, and a subtraction function that calculates X by subtracting the number of target dots selected from the dots in $\beta$ types, in an image forming apparatus capable of forming dots in $\alpha$ types ($\alpha$ is an integer satisfying $\alpha \geq 2$), and processes by the aforesaid target dot selection function, the second quantization function and by a subtraction function are repeated until X is reduced to zero in the subtraction function.

In the invention described in Item 29, there are realized a target pixel selection function that selects a target pixel, a recording rate acquisition function that acquires a recording rate total value of dots in $\beta$ types ($\beta$ is an integer satisfying $2 \leq \beta \leq \alpha$) among dots in $\alpha$ types and a recording rate for each of dots in ($\beta-1$) types, the first quantization function that conducts quantization based on the aforesaid recording rate total value and determines recording of dots in quantity of i (i is an integer satisfying $0 \leq i \leq \beta$) on the aforesaid target pixel, a target dot selection function that selects a target dot which has not been selected from dots in X types (initial value of X is X=β), the second quantization function that determines whether to record the target dot on the target pixel or not, based on the number i for dots to be recorded on the target pixel determined by the first quantization function and on the recording rate of the target dot, and a subtraction function that calculates X by subtracting the number of target dots selected from the dots in β types, in the image forming apparatus capable of forming dots in α types (α is an integer satisfying $\alpha \geq 2$), in the image forming program, and processes by the aforesaid target dot selection function, the second quantization function and a subtraction function are repeated until X is reduced to zero in the aforesaid subtraction function, whereby, granulation feeling caused by random overlapping between arranged dots can be reduced. Further, when the total printing rate for these dots exceeds 100%, in other words, even under the condition that dots are overlapped, the overlapped dots can be selected under the excellent dispersion, thus, visual granulation feeling can be controlled. Further, since a common halftone means is used for both an occasion where the total printing rate of dots exceeds 100% and an occasion where the total printing rate of dots does not exceed 100% in the first quantization means, a boundary line between 100% or more and 100% or less is not observed even when dots of one type only are observed, resulting in acquisition of smooth images which are free from pseudo-contours.

The invention described in Item 30 is the image forming program described in Item 33 wherein the dots in β types are those each being different in terms of density in the image forming program described in Item 29.

The invention described in Item 31 is the image forming program according to the Item 29 or Item 30, wherein the dots in β types are those each being different in terms of a dot diameter on a recording medium.

The invention described in Item 32 is the image forming method according to any one of the Item 29-Item 31, wherein the dots in β types are those each being different in terms of the hue.

In the invention, its effects are exhibited, even when the aforesaid dots in β types are those each being different in terms of density, or when the aforesaid dots in β types are those each being different in terms of a dot diameter on a recording medium, or when the aforesaid dots in β types are those each being different in terms of hue, as described in the Items 30, 31 and 32. Namely, it is possible to control uneven density between dots each being different in terms of density or in terms of a dot diameter, and it is further possible to control uneven color difference between dots each being different in terms of hue.

The invention described in Item 33 is the image forming program according to any one of the Item 29-Item 32, wherein the target dot selection function has a function to select, beginning with dots having higher visual influence.

In the invention described in Item 33, the target dot selection function has a function to select, beginning with dots having higher visual influence, whereby, it is possible to secure dispersibility of the dots and to obtain images with less granulation feeling, by selecting, beginning with dots having higher visual influence, in other words, with remarkable dots.

In the invention described in Item 34, there are realized a target pixel selection function that selects a target pixel, a recording rate acquisition function that acquires a recording rate total value of dots in 2 types among dots in α types and a recording rate for either one of the two types dots, the first quantization function that conducts quantization based on the aforesaid recording rate total value and determines recording of dots in quantity of i (i is an integer satisfying $0 \leq i \leq 2$) on the aforesaid target pixel, and the second quantization function that determines a type of the dot to be recorded on the aforesaid target pixel, based on the number of dots i to be recorded on the target pixel determined in the first quantization function and on the recording rate of the aforesaid dot on one side, in the image forming apparatus capable of forming dots in α types (α is an integer satisfying $\alpha \geq 2$), in the image forming program.

In the invention described in Item 34, there are realized a target pixel selection function that selects a target pixel, a recording rate acquisition function that acquires a recording rate total value of dots in 2 types among dots in α types and a recording rate for either one of the two types dots, the first quantization function that conducts quantization based on the aforesaid recording rate total value and determines recording of dots in quantity of i (i is an integer satisfying $0 \leq i \leq 2$) on the aforesaid target pixel, and the second quantization function that determines a type of the dot to be recorded on the aforesaid target pixel, based on the number of dots i to be recorded on the target pixel determined by the first quantization function and on the recording rate of the aforesaid dot on one side, in the image forming apparatus capable of forming dots in α types (α is an integer satisfying $\alpha \geq 2$), in the image forming program, whereby, granulation feeling caused by random overlapping between arranged dots can be reduced. Further, when the total printing rate for these dots exceeds 100%, in other words, even under the condition that dots are overlapped, the overlapped dots can be selected under the excellent dispersion, thus, visual granulation feeling can be controlled. Further, since a common halftone means is used for both an occasion where the total printing rate of dots exceeds 100% and an occasion where the total printing rate of dots does not exceed 100%, a boundary line between 100% or more and 100% or less is not observed even when dots of one type only are observed, resulting in acquisition of smooth images which are free from pseudo-contours. Further, when conducting quantization for two types of dots among dots in α types as in the Item 34, it is possible to conduct quantization through more simple processing than in the occasion of conducting quantization for three types of dots among dots in α types, thus, processing speed can be improved, and a load of processing for the apparatus can be reduced.

The invention described in Item 35 is the image forming program according to Item 34, wherein the aforesaid dots in two types are those which are different in terms of density each other.

The invention described in Item 36 is the image forming program according to Item 34, wherein the aforesaid dots in two types are those which are different in terms of a dot diameter on a recording medium each other.

The invention described in Item 37 is the image forming program according to Item 34, wherein the aforesaid dots in two types are those which are different in terms of the hue each other.

In the invention, its effects are exhibited, even when the aforesaid dots in 2 types are those which are different in terms of density each other, or those which are different in terms of a dot diameter on a recording medium each other, or those which are different in terms of hue, as described in the Items 35, 36 and 37. Namely, it is possible to control uneven density between dots each being different in terms of density or in terms of a dot diameter, and it is further possible to control uneven color difference between dots each being different in terms of hue.

The invention described in Item 38 is the image forming program according to any one of Items 29-37, wherein the aforesaid first quantization function is equipped with a function to quantize in a dithering method in which the recording rate total value on the target pixel is compared with a dither matrix value corresponding to the target pixel.

In the invention described in Item 38, the aforesaid first quantization function is equipped with a function to quantize in a dithering method in which the recording rate total value on the target pixel is compared with a dither matrix value corresponding to the target pixel, whereby the dithering method makes it possible for the first quantization function to conduct processing at high speed.

The invention described in Item 39 is the image forming program according to any one of Items 29-37, wherein the aforesaid first quantization function is equipped with a function to conduct quantization through an error diffusion method wherein an error caused by the first quantization on the processed peripheral pixel is reflected on the recording rate total value corresponding to the target pixel, and thereby diffuses errors caused by the aforesaid quantization on unprocessed peripheral pixels.

In the invention described in Item 39, the aforesaid first quantization function is equipped with a function to conduct quantization through an error diffusion method wherein an error caused by the first quantization on the processed peripheral pixel is reflected on the recording rate total value corresponding to the target pixel, and thereby to diffuse errors caused by the aforesaid quantization on unprocessed peripheral pixels, thus, dispersion of total dots is made to be excellent by using the error diffusion method for the processing by the first quantization function.

The invention described in Item 40 is the image forming method according to any one of Items 29-39, wherein the aforesaid second quantization function is equipped with a function to conduct quantization through an error diffusion method wherein an error caused by the second quantization on the processed peripheral pixel is reflected on the recording rate of the corresponding target dot, and thereby to diffuse errors caused by the aforesaid quantization on unprocessed peripheral pixels.

In the invention described in Item 40, the aforesaid second quantization function is equipped with a function to conduct quantization through an error diffusion method wherein an error caused by the second quantization on the processed peripheral pixel is reflected on the recording rate of the corresponding target dot, and thereby to diffuse errors caused by the aforesaid quantization on unprocessed peripheral pixels, thus, it becomes possible to select a dot position under the condition of excellent dispersion, by conducting processing by the second quantization function through the error diffusion method.

The invention described in Item 41 is the image forming program according to any one of Items 29-40, wherein the recording rate acquisition function is equipped with a function to transform input pixel values by using a prescribed degradation table and to acquire the aforesaid recording rate total value and the recording rate of not less than 1.

In this case, when recording an input pixel value with a single hue by the use of plural dots, for example, it is possible either to prepare recording rates of respective dots based on input pixel values by using a degradation table, to calculate the recording rate total value based on respective recording rates, or to preserve recording rate total value in the degradation table.

The invention described in Item 42 is the image forming program according to any one of Items 29-41, wherein the recording rate acquisition function is equipped with a function wherein respective recording rates corresponding to pixel values are preserved in advance.

EFFECTS OF THE INVENTION

The present invention makes it possible to improve dot dispersion and to form images with high image quality.

PREFERRED EMBODIMENT TO PRACTICE THE INVENTION

An image forming apparatus, an image forming method and an image forming program relating to the embodiment of the invention will be explained as follows, referring to the drawings. However, the invention is not limited to those illustrated.

First Embodiment

In the beginning, the first embodiment will be explained with reference to FIGS. 1-8.

FIG. 1 is a block diagram showing the schematic structure of image forming apparatus 1 relating to the first embodiment.

The image forming apparatus 1 is an apparatus capable of being mounted on a widely known output apparatus (an image recording means) such as an inkjet printer, and it is an apparatus that quantizes input values composed of multitone image data wherein image data with prescribed number of bits (prescribed number of tones) are allocated to each pixel constituting an image for each pixel to transform them into output values composed of pseudo-continuous tone data.

As shown in FIG. 1, the image forming apparatus 1 is equipped with various means such as target pixel selection means 2 that realizes target pixel selection function in a target pixel selection process which will be described later, recording rate acquisition means 3 that realizes recording rate acquisition function in a recording rate acquisition process, first quantizing means 4 that realizes a first quantizing function in the first quantizing process, and second quantizing means 5 that realizes a second quantizing function in the second quantizing process.

Each means of the image forming apparatus 1 is composed of CPU (Central Processing Unit), ROM (Read Only Memory) and RAM (Random Access Memory). In the image forming apparatus 1, an image forming program that conducts processing of image data is housed in ROM, and CPU reads out the image forming program housed in ROM with RAM serving as a work area, whereby, various kinds of processing each being equipped with each function are practiced, following the image forming program. In other words, the image forming program makes CPU of the image forming apparatus 1 to practice each processing described later.

Next, an image forming method in the first embodiment will be explained.

First, in the present embodiment, there are given an occasion for forming dots of plural types in different hues and an occasion for forming dots of plural types in different density per unit area for a single hue. As a method for forming dots in plural types for a different hue, there is given a method to form each dot by using different ink for each different hue.

Next, a method for forming dots of plural types in different density per unit area for a single hue will be explained. As a method to form a dot in different density per unit area, there is given a method to change density of ink on each dot or to change a dot diameter of each dot.

For changing ink density, there are given an occasion where light color ink and dark color ink are prepared in advance and each of them is jetted from a different head and an occasion where nozzles each jetting each ink are provided in the same head. Further, when liquid ink is used, it is also possible to arrange so that light color ink is realized by mixing dark color ink and transparent ink.

Further, when changing a dot diameter, there is an occasion to change a dot diameter (a size of a droplet) by adjusting a drive time cycle for a head of an inkjet printer. Namely, when a drive time cycle is short, a dot diameter is small, and when a drive time cycle is long, a dot diameter is large depending on the length of the drive time cycle. Further, it is also possible either to prepare nozzles each forming a dot having a different dot diameter in the same head in advance or to prepare heads each being equipped with a nozzle forming a dot having a different dot diameter.

The present embodiment has the structure wherein two types of ink including light color ink and dark color ink are prepared in advance for each color, and each of them is jetted from a different head, and there will be explained image processing that corresponds to an inkjet printer for forming dots in two types of dark and light colors for each color.

Next, there will be explained a flow of operations covering from an input of original images to an output of images outputted onto a printer.

First, image data composed of multitone image data (pixel values of input images in target pixels) are inputted in RAM of image forming apparatus 1 (step S1), and the input images are transformed from vector data to raster data (rasterized) as occasion demands (step S2).

Then, color changes matching the printer for printing are made (step S3). Specifically, colors composed of red, green and blue (RGB) displayed on a display are converted into data of CMY (K) of cyan, magenta yellow and (black), for printing on a reflection type medium.

Based on these data, halftone processing (details are described later) is conducted (step S4). An arrangement of each dot is determined by this halftone processing. Incidentally, for images after color changes, processing is made for each pixel by conducting scanning in the regular direction or by conducting surpentine scanning.

After the halftone processing, output processing (printing processing) by a printer is conducted (step S5).

Next, halftone processing in the aforesaid step S4 will be explained by using a flow chart shown in FIGS. 3 and 4.

Figure 3:
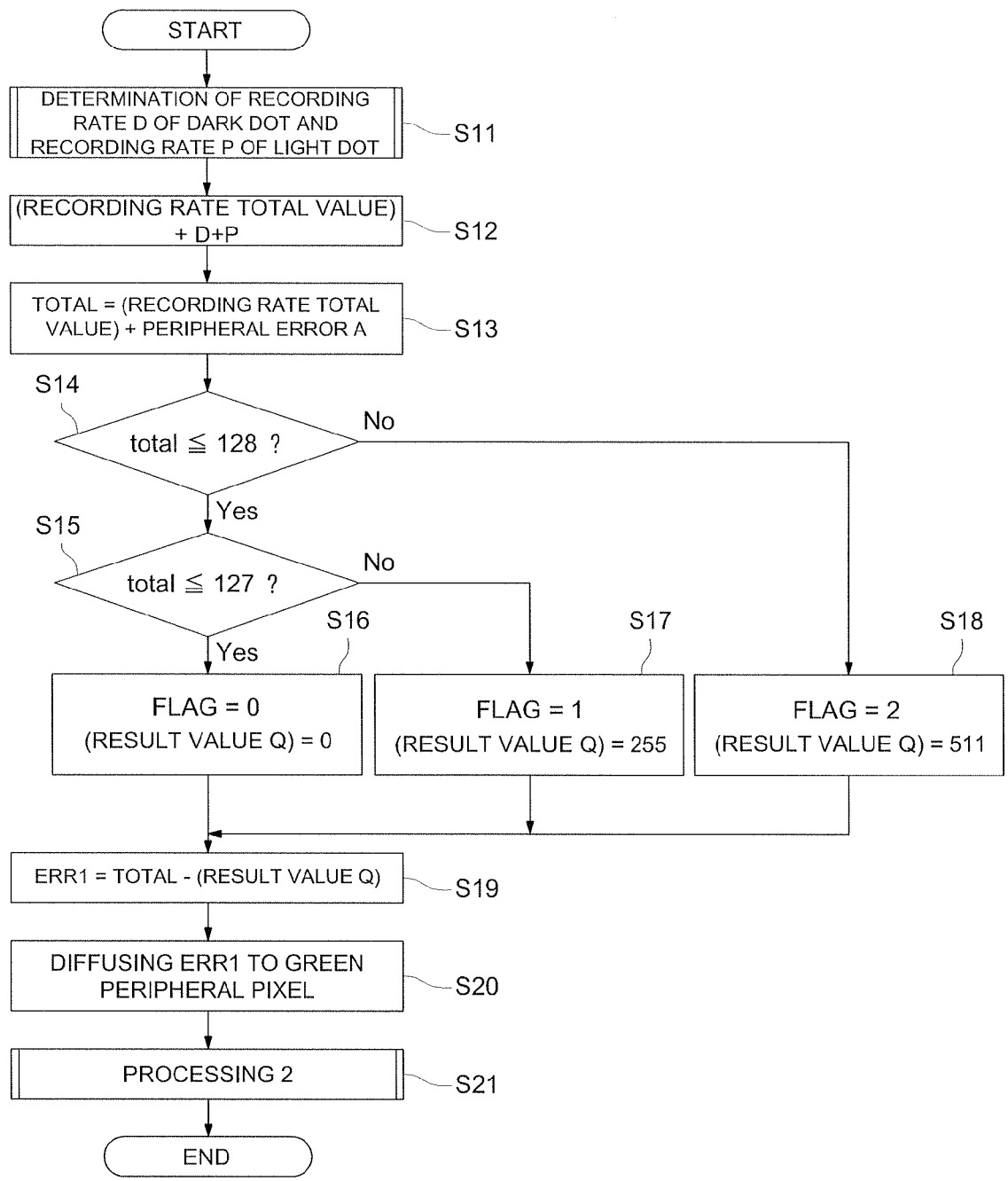
FIG. 3 is a flow chart showing halftone processing in the first embodiment.
Figure 4:
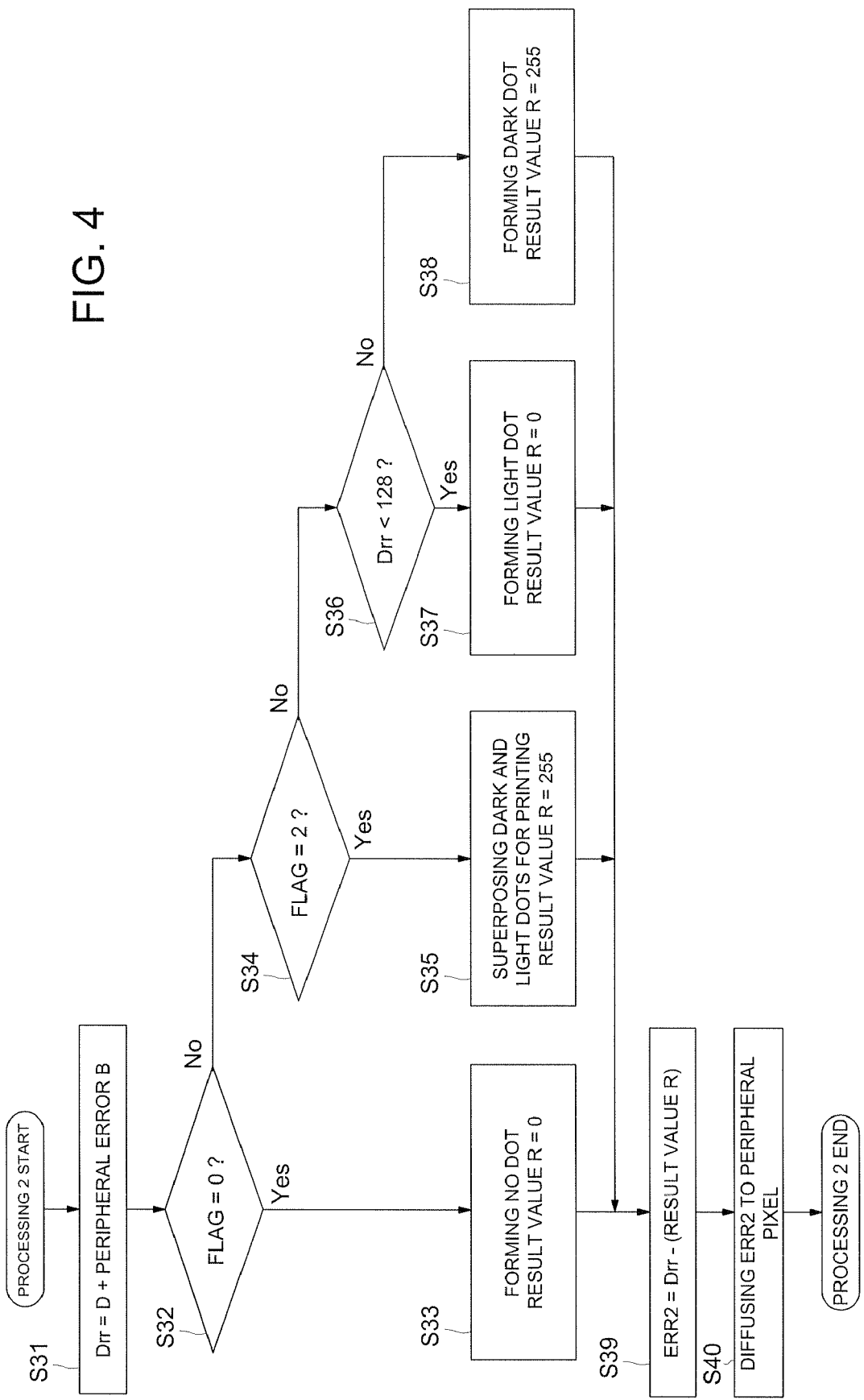
FIG. 4 is a flow chart showing halftone processing in the first embodiment.

Each of FIGS. 3 and 4 shows halftone processing in the case of an inkjet printer that forms dots in two types including a dark dot and a light dot for ink of each color.

First, target pixel selection means 2 shown in FIG. 1 (a target pixel selection function of an image forming program) conducts scanning in the regular direction or surpentine scanning to conduct target pixel selecting process for selecting pixels one by one as a target pixel (not shown).

Figure 5:
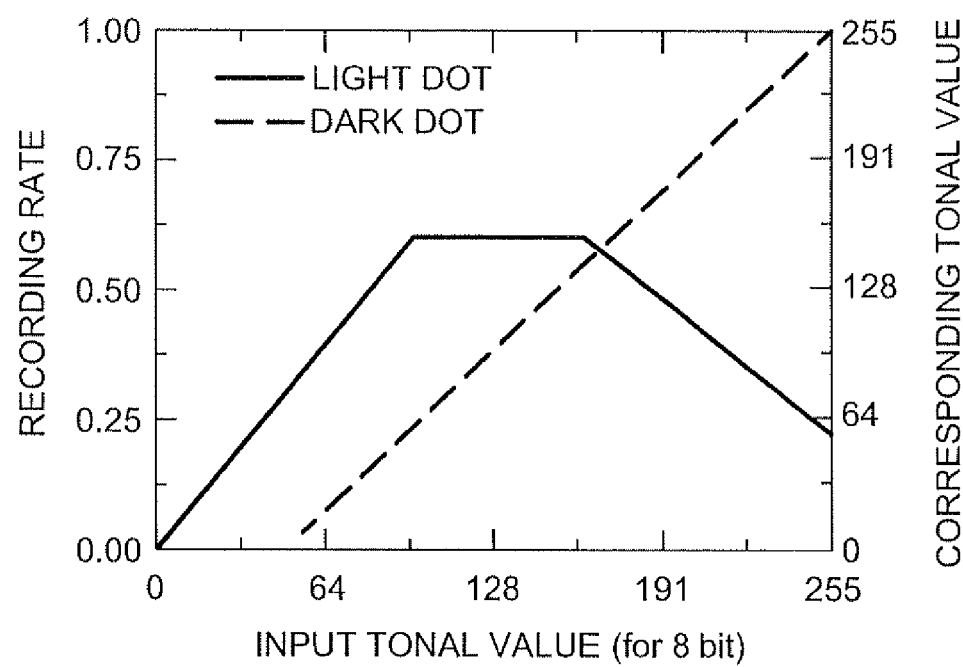
FIG. 5 is a graph showing an example of a table determining recording rates of dark dots and light dots for input pixel (gradation) values.

Next, recording rate acquisition means 3 (a recording rate acquisition function of an image forming program) shown in FIG. 1 conducts a recording rate acquisition process to acquire recording rate D of a dark dot and recording rate P of a light dot (step S11) and to acquire recording rate total value D+P (step S12) as shown in FIG. 3 by using a degradation table shown in FIG. 5, for example, for each color of CMYK in input pixel values.

In FIG. 5, the horizontal axis is represents an input pixel value of an image in each hue, and an occasion of 8-bit is imagined in this particular case. If the input pixel value is made to be 8-bit, a value to be taken is in the range of 0-255. The vertical axis is on the left side represents a recording rate of each of a dark dot and a light dot for the input pixel value, and the recording rate is defined by a generation probability of a dot in one pixel. A corresponding tonal value of the vertical axis is on the right side is one wherein the vertical axis is on the left side is allocated to an 8-bit scale, and for example, when an input pixel value is 96, the recording rate is 0.23 for the dark dot and 0.6 for the light dot respectively. Therefore, the corresponding tonal value is 59 for the dark dot and 154 for the light dot respectively.

Incidentally, in the present embodiment, recording rate D of a dark dot and recording rate P of a light dot are acquired, and recording rate total value D+P is acquired by adding up the recording rate D and the recording rate P. However, the invention is not limited to this, and it is also possible to arrange so that numerical values of the recording rate total values are preserved in advance as data, and the recording rate total value and recording rate D for dark dot (or, recording rate P for light dot), for example, are acquired.

Next, first quantization means 4 (the first quantization function of an image processing program) shown in FIG. 1 conducts first quantization process. In the first quantization process in the first embodiment, an error diffusion method is used. This error diffusion method is a method wherein tonal errors generated on the processed pixels are distributed to unprocessed pixels surrounding the processed pixels by adding prescribed weight, and their peripheral errors are reflected on pixels to be processed, as will be described later.

First, recording rate total value D+P is added to peripheral error A for the total value to make the total (step S13), and the total is judged whether it is greater or smaller than a prescribed value (which is 384 in this case) (step S14).

When the total is greater than 384 in this case, 511 is substituted for result value Q for the total, and FLAG is made to be 2 (step S18). In contrast to this, when the total is not more than 384, the total is then judged whether it is greater or smaller than another prescribed value (which is 127 in this case) (step S15).

When the total is greater than 127 in this case, 255 is substituted for result value Q for the total, and FLAG is made to be 1 (step S17). In contrast to this, when the total is not more than 127, 0 is substituted for result value Q and FLAG is made to be 0 (step S16).

In the meantime, when FLAG=2 holds, it is an occasion wherein two dots are recorded on the target pixel, namely, an occasion wherein dots in two types including a dark dot and a light dot are dotted in piles, when FLAG=1 holds, it is an occasion wherein a single dot is recorded on the target pixel, namely, an occasion wherein either one of dark and light dots determined in the second quantization process described later is dotted, and when FLAG=0 holds, it is an occasion wherein zero dot is recorded on the target pixel, namely, an occasion wherein no dot is formed.

In the aforesaid way, a judgment is formed concerning how many dots should be formed once for each pixel, namely, concerning whether two dots should be recorded in piles in the present embodiment or not, or whether either one of dark and light dots should be recorded or not, or whether a dot should be formed or not, independently of a dark dot and a light dot and of a size of a dot.

After that, the aforesaid result value Q is subtracted from the total to make ERR1 (step S19), and the ERR1 is diffused on unprocessed peripheral pixels (step S20). Then, processing 2 shown in FIG. 4 is practiced (step S21).

In the processing 2, the second quantization process by second quantization means 5 shown in FIG. 1 (second quantization function of an image forming program) is carried out.

In the present embodiment, an error diffusion method is used even in the second quantization process.

In this case, peripheral error B for the dark dot is added to recording rate D for the dark dot to make Drr (step S31), and a judgment is formed whether FLAG=0 holds in the first quantization process for the pixel or not (step S32). When FLAG=0 holds in this case, it is determined that no dot is formed, and 0 is substituted for result value R (step S33).

In contrast to this, when FLAG=0 did not hold, a judgment is formed next whether FLAG=2 holds in the first quantization process for the pixel or not (step S34). When FLAG=2 holds in this case, it is determined to dot a dark dot and a light dot in piles, and 255 is substituted for result value R (step S35).

When FLAG=2 did not hold, a judgment is formed next whether Drr is greater or smaller than 128, because of FLAG=1 (step S36). When Drr is smaller than 128, it is determined to record only light dot, and 0 is substituted for result value R (step S37).

In contrast to this, when Drr is 128 or more, it is determined to record only dark dot, and 255 is substituted for result value R (step S38).

After that, the aforesaid result value Q is subtracted from Drr to make ERR2 (step S39), and the ERR2 is diffused on unprocessed peripheral pixels (step S40).

The processing of this kind is carried out on all of the pixels which form an image. At the point in time when processing in FIG. 3 and processing in FIG. 4 have been completed for all pixels, halftone processing in FIG. 2 (step S4) is terminated.

Figure 6A:
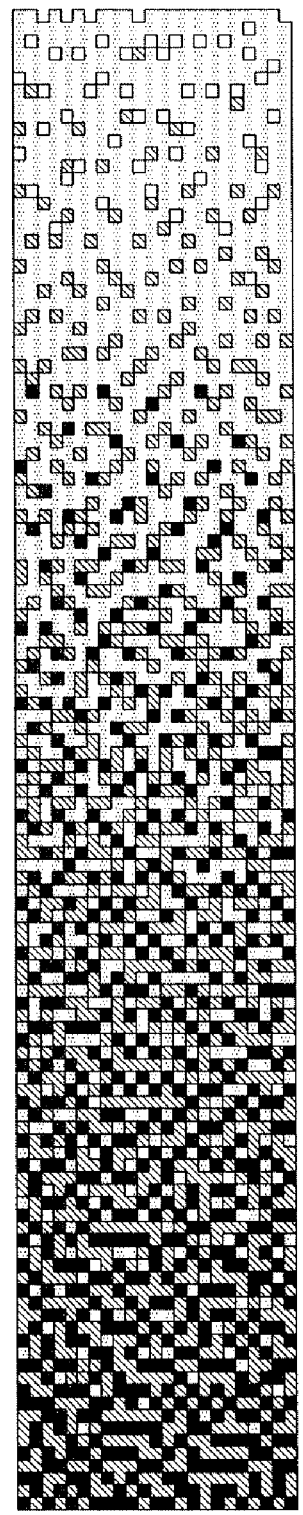
FIG. 6(a) is an image diagram showing output images with high density outputted through processing in the first embodiment.
Figure 6B:
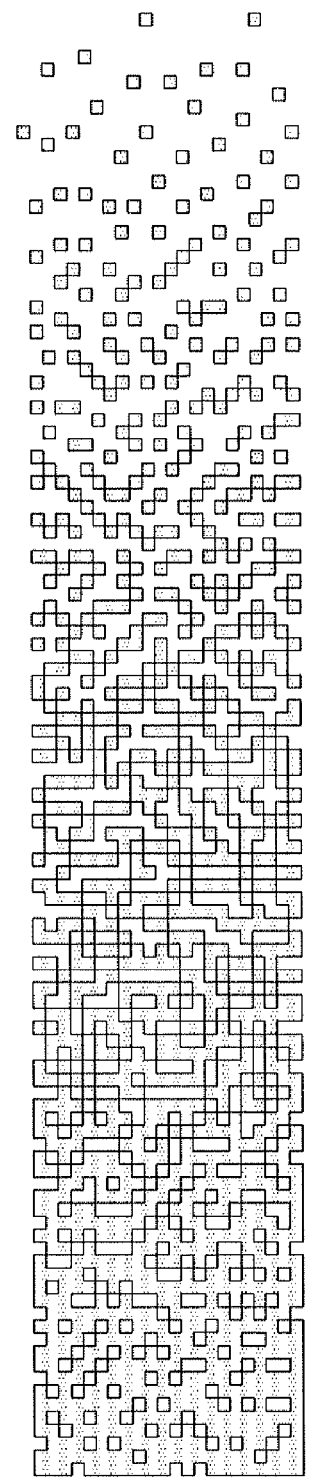
FIG. 6(b) is an image diagram showing output images with low density outputted through processing in the first embodiment.

FIGS. 6(a) and 6(b) show image examples obtained based on the processing stated above.

Figure 7A:
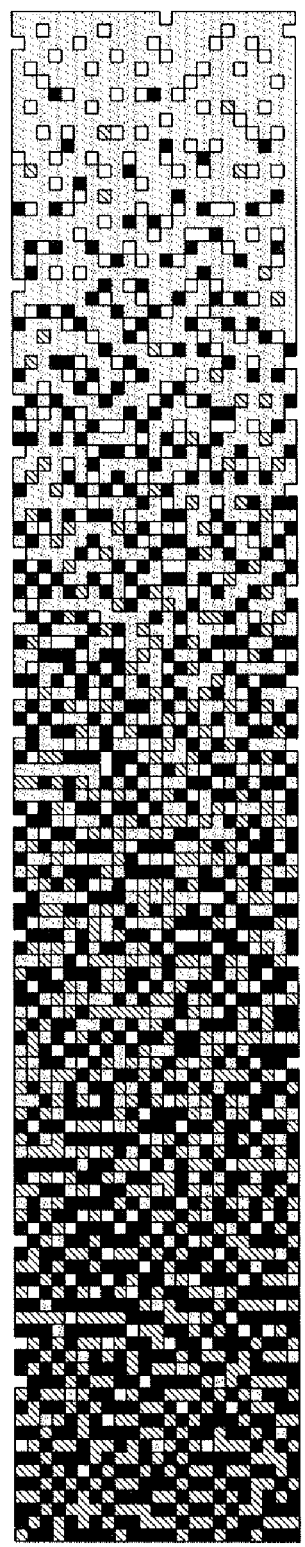
FIG. 7(a) is an image diagram showing output images with high density outputted through conventional processing as a comparative example.
Figure 7B:
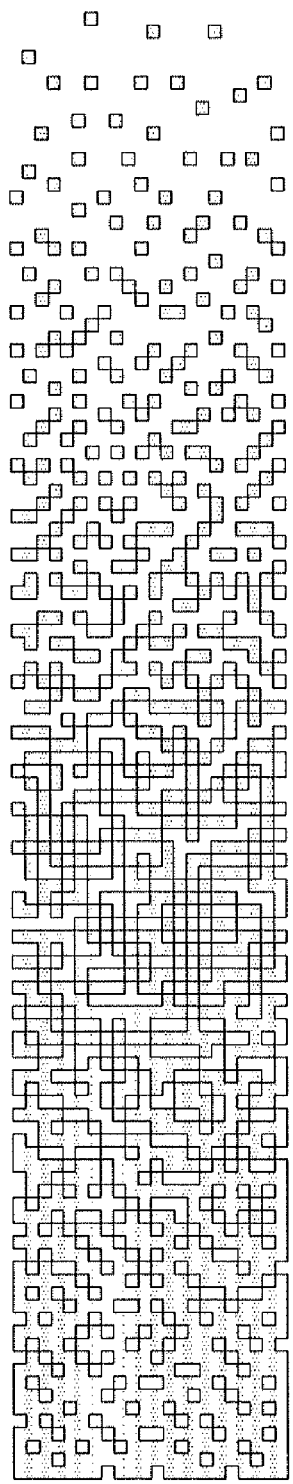
FIG. 7(b) is an image diagram showing output images with low density outputted through conventional processing as a comparative example.

FIGS. 7(a) and 7(b) show image examples obtained by conducting halftone processing independently based on recording rates for the dark dot and the light dot, and by combining them as comparative examples.

Figure 8A:
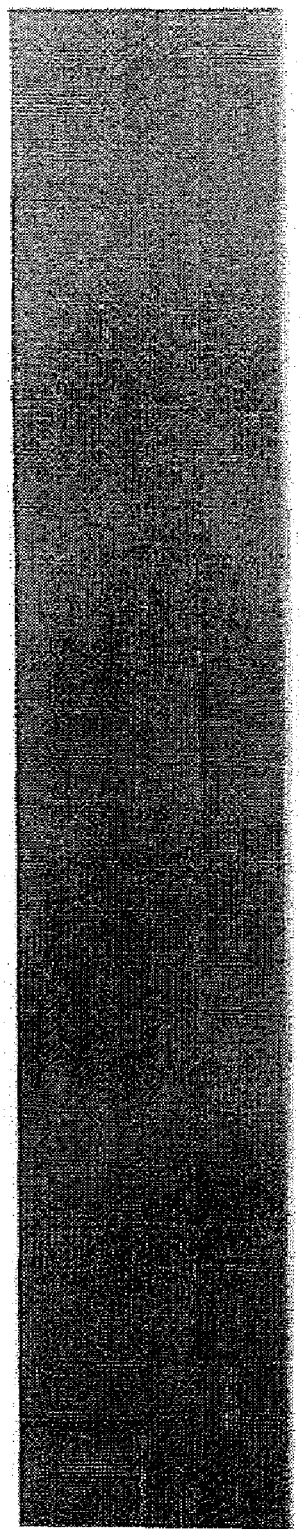
FIG. 8(a) is an image diagram showing input images serving as original diagrams for FIG. 6(a) and FIG. 7(a).
Figure 8B:
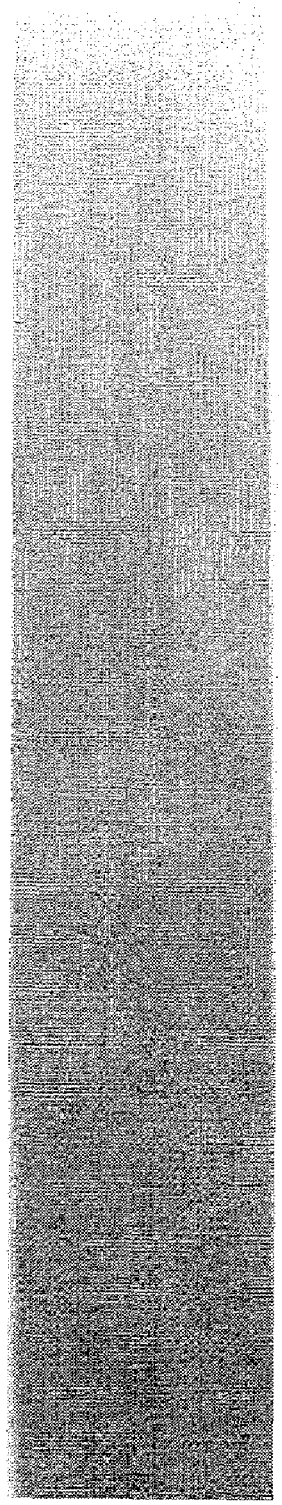
FIG. 8(b) is an image diagram showing input images serving as original diagrams for FIG. 6(b) and FIG. 7(b).

Incidentally, FIGS. 8(a) and 8(b) show input images which serve as original images for FIGS. 6(a) and 6(b) and for FIGS. 7(a) and 7(b).

Namely, the image forming apparatus of the present embodiment makes it possible to obtain output images which have been processed by halftone processing shown in FIGS. 6(a) and 6(b), from input images shown in FIGS. 8(a) and 8(b). Now, when FIGS. 6(a) and 6(b) representing output images of the present embodiment are compared with FIGS. 7(a) and 7(b) representing output images of comparative examples, images in FIGS. 6(a) and 6(b) seem to be better totally in terms of dot dispersibility.

When density of output images is made to be high, it is necessary to dot 100% or more of dots by overlapping dots in plural types. Even in this case, FIG. 6(a) representing a result of the processing of the present embodiment shows dot dispersibility that is better than that of FIG. 7(a) representing a result of the processing in the comparative example, in particular.

Second Embodiment

The second embodiment will be explained as follows, referring to FIGS. 9-12.

In the present embodiment, there will be explained an image forming apparatus that is applied to an inkjet printer forming dots in three types of large, medium and small sizes for each color ink, an image forming method and an image forming program. In the meantime, as shown in FIG. 9, the second embodiment is the same as the aforesaid first embodiment, except for the point that a part of the image forming apparatus is different and the point that halftone processing in the step S4 in the image forming method is the processing shown in each of the flow charts in FIGS. 10 and 11, and explanations for the same processing and the same structure will be omitted accordingly.

First, image forming apparatus 11 relating to the second embodiment will be explained.

Figure 9:
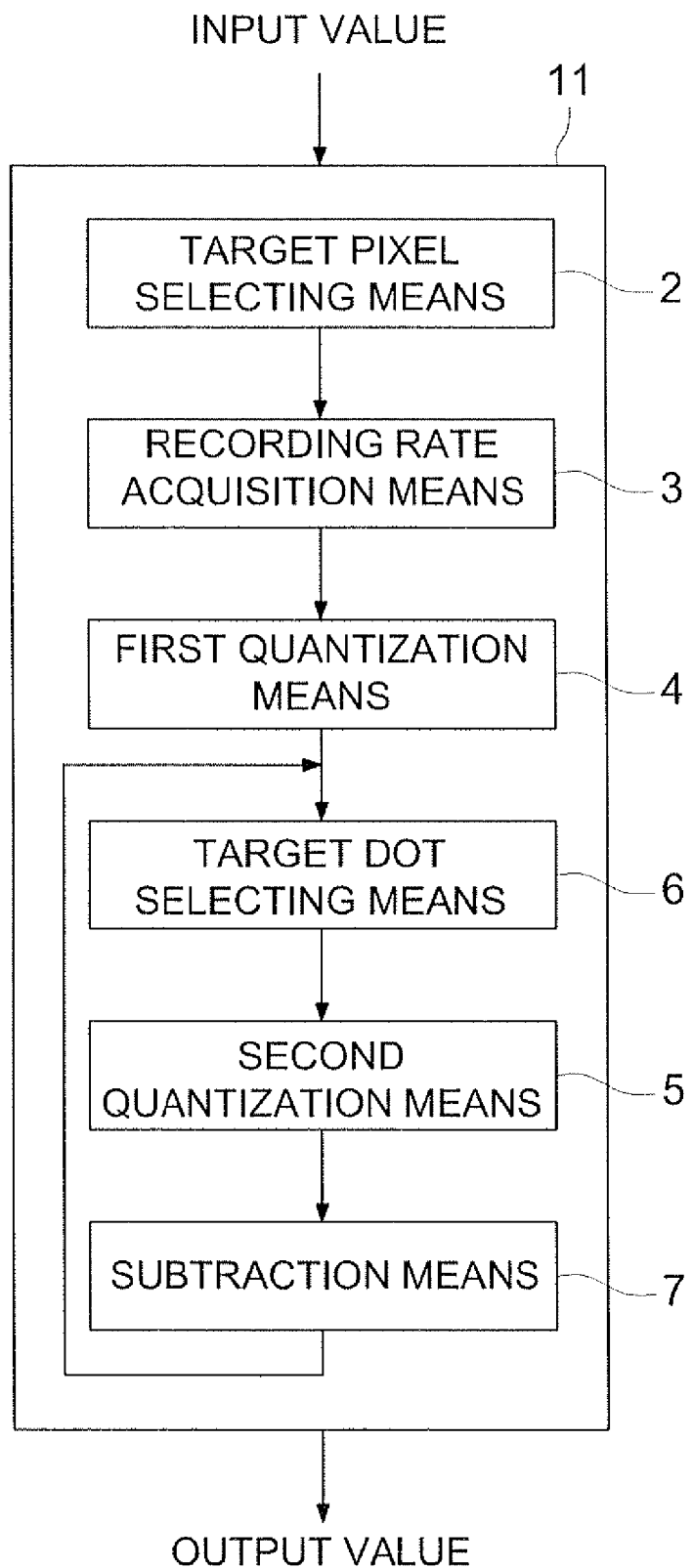
FIG. 9 is a block diagram showing a schematic structure of the second embodiment relating to an image forming apparatus of the invention.

FIG. 9 is a block diagram showing the schematic structure of the image forming apparatus 11 relating to the second embodiment.

As shown in FIG. 9, the image forming apparatus 11 of the present embodiment is composed of respective means including target pixel selection means 2 that realizes a target pixel selection function in the target pixel selection process, recording rate acquisition means 3 that realizes a recording rate acquisition function in the recording rate acquisition process, first quantization means 4 that realizes first quantization function in the first quantization process, target dot selection means 6 that realizes target dot selection function in the second quantization process and subtraction means 7 that realizes subtraction function in the subtraction process.

Incidentally, each of the structures for the second target pixel selection means 2, the recording rate acquisition means 3, the first quantization means 4 and the second quantization means 5 is the same as that of the first embodiment.

Next, an image processing method in the second embodiment will be explained.

In the present embodiment, there is shown halftone processing in the case of an inkjet printer that forms dots in three types of large, medium and small sizes for each color ink. Meanwhile, explanation for processing and structure which are the same as those in the aforesaid first embodiment will be omitted.

Halftone processing in the image processing method of the second embodiment will be explained as follows, by the use of flow charts in FIGS. 10 and 11.

First, target pixel selection means 2 shown in FIG. 9 (target pixel selection function of an image forming program) conducts a target pixel selection process for selecting pixels one by one by conducting scanning in the regular direction or by conducting meandering scanning (illustration is omitted).

Figure 10:
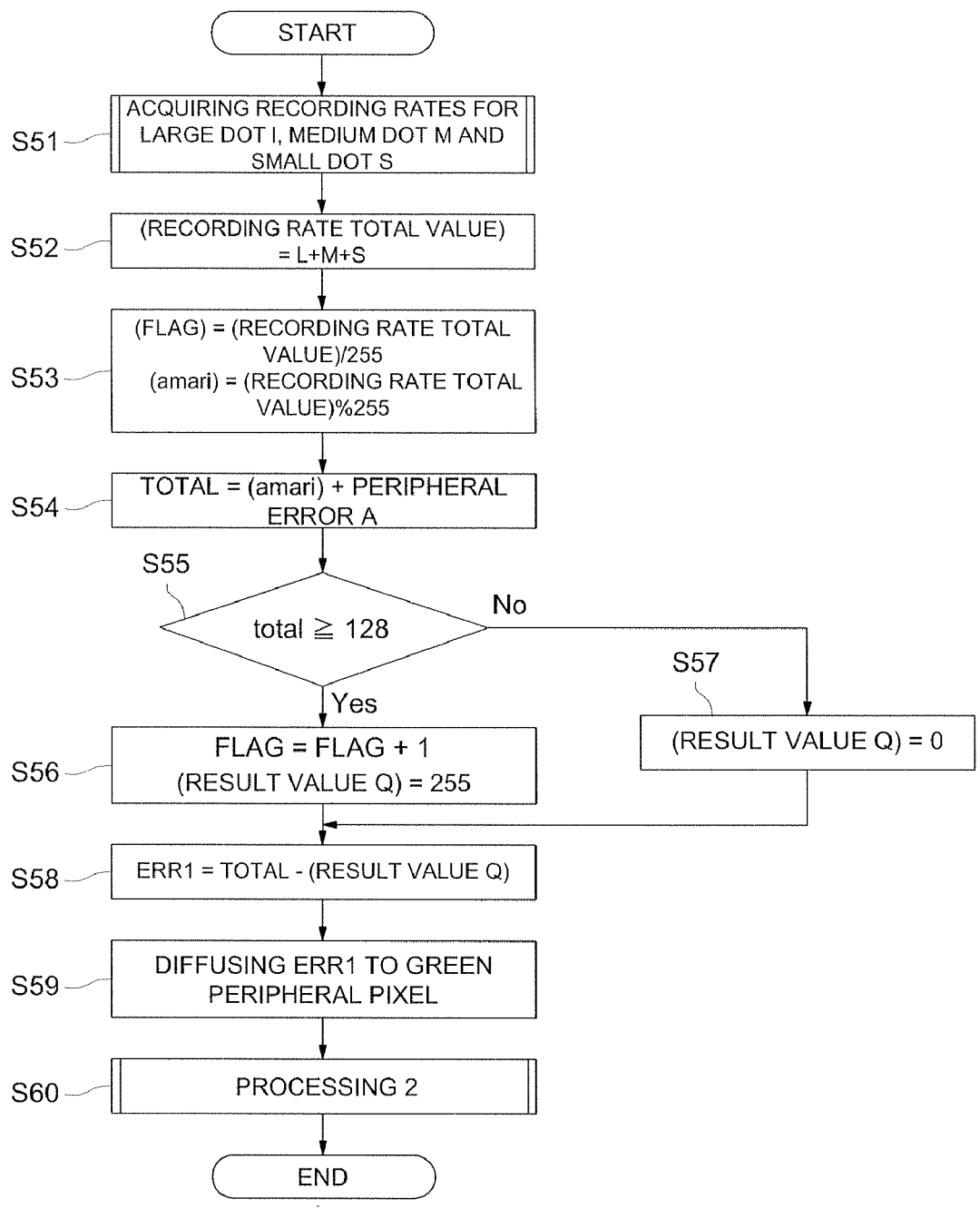
FIG. 10 is a flow chart showing halftone processing in the second embodiment.
Figure 12:
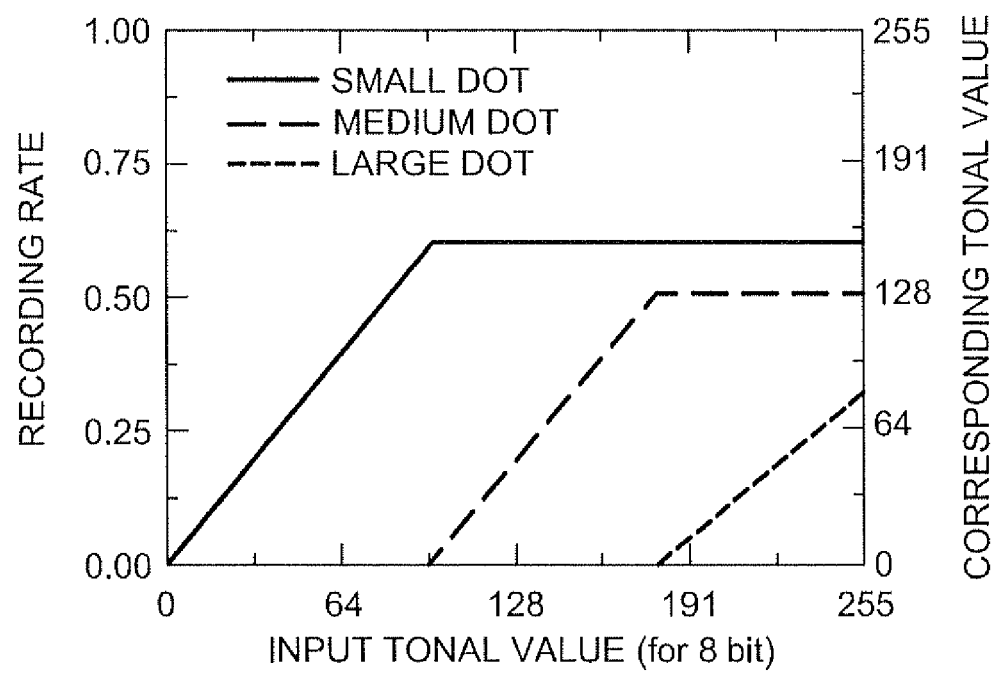
FIG. 12 is a graph showing an example of a table determining recording rates of large, medium and small dots for input pixel (gradation) values.

Next, recording rate acquisition means 3 shown in FIG. 9 (recording rate acquisition function of the image forming program) conducts a recording rate acquisition process for acquiring recording rate S for large dot recording rate L, medium dot recording rate M and small dot recording rate S as shown in FIG. 10 by using a degradation table shown in FIG. 12, for example, for each of CMYK colors in input pixels (step S51) and for acquiring recording rate total value L+M+S (step S52).

Meanwhile, in the present embodiment, large dot recording rate L, medium dot recording rate M and small dot recording rate S are acquired, and these are added up to acquire the recording rate total value L+M+S. However, the invention is not limited to this, and it is also possible to arrange so that numerical values of the recording rate total value are preserved as data in advance, and the recording rate total value and large dot recording rate L and medium dot recording rate M, for example, (or large dot recording rate L and small dot recording rate S, or medium dot recording rate M and small dot recording rate S) are acquired.

Next, first quantization means 4 shown in FIG. 9 (first quantization function of the image forming program) conducts the first quantization process. In this first quantization process in the second embodiment, an error diffusion method is used.

First, the quotient of a value obtained by dividing recording rate total value L+M+S (0≦L+M+S≦765) obtained in step S52, namely, an integer portion (0≦integer portion≦3) is substituted for FLAG, and a remainder portion (0≦remainder portion≦254) of a value obtained by dividing recording rate total value L+M+S (0≦L+M+S≦765) by 255 is substituted for amari (step S53). Incidentally, "(recording rate total value) %255" in step S53 means "the remainder of a value obtained by dividing the recording rate total value by 255".

Next, peripheral error A for the total value is added to amari to make total (step S54), and a judgment is formed whether the total is greater or smaller than a prescribed value (which is 128 in this case) (step S55).

In this case, when the total is 128 or more, 255 is substituted for result value Q for the total, and 1 is added to FLAG (FLAG=FLAG+1) (step S56). In contrast to this, when the total is smaller than 128, the FLAG remains unchanged, and 0 is substituted for result value Q for the total (step S57).

Incidentally, an occasion of FLAG=3 is a case where three dots are recorded on the target pixel, namely, a case where dots in three types including a large, medium and small sizes are dotted in piles, an occasion of FLAG=2 is a case where two dots are recorded on the target pixel, namely, a case where dots in two types determined in the second quantization process described later among three types including a large, medium and small sizes are dotted in piles, an occasion of FLAG=1 is a case where one dot is recorded on the target pixel, namely, a case where any one dot determined in the second quantization process described later among three types including a large, medium and small sizes is dotted, and an occasion of FLAG=0 is a case where zero dot is recorded on the target pixel, namely, a case where no dot is formed.

In the aforesaid way, a judgment is formed concerning how many dots should be formed once for each pixel, namely, concerning whether three dots should be recorded in piles in the present embodiment or not, or, whether two dots among large, medium and small sizes should be recorded, or whether any one of large, medium and small dots should be recorded, independently of dark, medium dark and light dots and of large, medium and small dots, or whether no dot should be formed.

After that, the aforesaid result value Q is subtracted from the total to make ERR1 (step S58), and the ERR1 is diffused on unprocessed peripheral pixels (step S59). Then, processing 2 shown in FIG. 11 is practiced (step S60).

In the processing 2, a target dot selection process by target dot selection means 6 (target dot selection function of an image forming program) shown in FIG. 9 is carried out first.

In the target dot selection process, number X of dots to be processed is defined first (step S81). The number of dots to be processed means types of dots in the second quantization process, and it is synonymous with types of dots which can be acquired in the recording rate acquisition process. In the present embodiment, X=3 is substituted, because dots in three types of large, medium and small sizes are processed.

Next, a judgment is formed whether or not the number X of dots to be processed defined in the step S81 is not zero (step S82). When the number X of dots to be processed is zero in this case, the processing 2 is terminated.

In contrast to this, when the number X of dots to be processed is not zero (1≦number X of dots to be processed≦3, in the present embodiment), process dots (target dots) SelDot to be processed in the second quantization process are selected (step S83). As the process dot SelDot, dots which have not been selected as process dots in target dots among the dots in three types of large, medium and small sizes, are selected in the present embodiment. Further, if a selection is made, beginning with dots having higher visual influence, in other words, beginning with larger dots in this case, it is possible to enhance effects to control granulation feeling of dots, which is advantageous.

Next, the second quantization process by second quantization means 5 (second quantization function of an image forming program) shown in FIG. 9 is carried out. In this second embodiment, an error diffusion method is also used even in the second quantization process, in the same way as in the first quantization process.

In this case, a peripheral error for the process dots is added to recording rate D [SelDot] of the process dot SelDot to make Drr (step S84), and a judgment is formed whether FLAG is made to be 0 for the pixel in the first quantization process or not (step S85). Incidentally, in the present embodiment, a target dot selection process, the second quantization process and the subtraction process are repeated for the number of times equivalent to the number of dots to be processed. In this case, respective processes are conducted with processing dots, beginning with large targets, next, medium size dots, and finally, small dots, and recording rate D of processing dots SelDot [SelDot] is the same as recording rate L for large dots, the same as recording rate M for medium size dots and the same as recording rate S for small dots. At this moment, in this case of FLAG=0, forming of no dot is determined, and 0 is substituted for result value R (step S86).

In contrast to this, when FLAG=0 does not hold, a judgment is formed whether FLAG represents the number X of dots to be processed or not for the pixel next (step S87). When FLAG represents the number X of dots to be processed in this case, forming of dots to be processed is determined, and 255 is substituted for result value R (step S88).

when FLAG does not represent the number X of dots to be processed, a judgment is formed whether Drr is greater or smaller than 128 (step S89). When Drr is smaller than 128 in this case, it is determined that dots to be processed are not formed, and 0 is substituted for result value R (step S90).

In contrast to this, when Drr is 128 or more, it is determined that dots to be processed are recorded, 1 is subtracted from FLAG (FLAG=FLAG-1) and 255 is substituted for result value R (step S91).

After that, the aforesaid result value R is subtracted from Drr to make ERR2 (step S92), and the ERR2 is diffused on corresponding buffer of selected process dots on unprocessed peripheral pixels (step S93).

Then, subtraction process by subtraction means 7 (subtraction function of an image forming program) shown in FIG. 9 is practiced (step S94). In the subtraction process, 1 is subtracted from the number X of dots to be processed. After that, S82-S94 are repeated until the number X of dots to be processed is reduced to zero.

Figure 2:
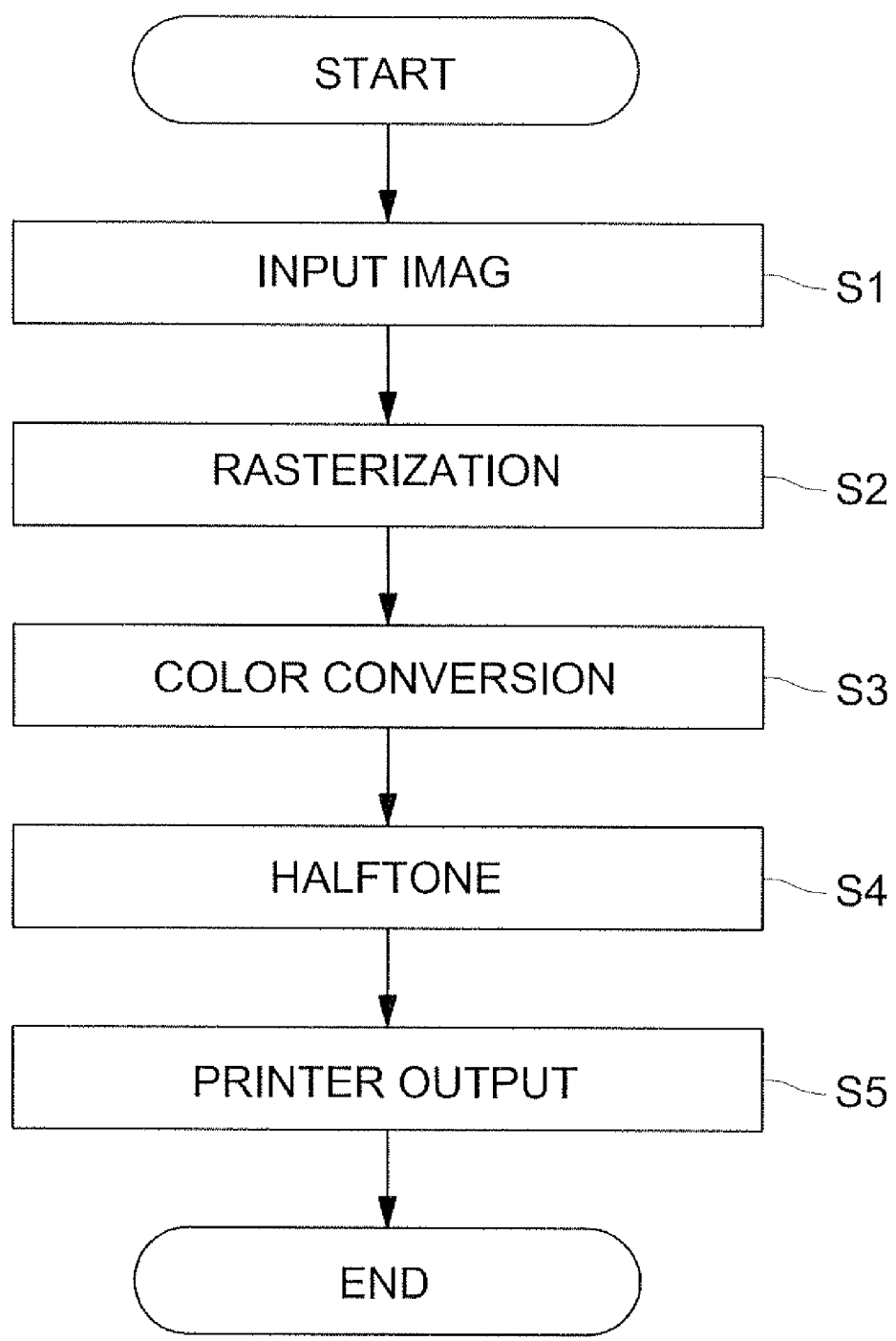
FIG. 2 is a flow chart showing a flow from input of original images to output images.

These processes are conducted for all pixels forming an image. At the point of time when processes in FIGS. 10 and 11 are completed for all pixels, halftone processing (step S4) in FIG. 2 is terminated.

Next, a variation of the second embodiment will be explained.

Though the first quantization process is conducted by the error diffusion method in the second embodiment, the first quantization process is conducted by a dither method that compares a recording rate total value on the target pixel with a dither matrix value corresponding to the target pixel, in the present variation, which is different from the aforesaid second embodiment. Incidentally, explanations for other processes and structures will be omitted, because they are the same as those in the second embodiment.

In the present variation, a dither matrix of 64×64 is used as a dither matrix. If the dither matrix is a multiple of 2, amari in S73 or the like can be calculated simply, and processing speed is enhanced, resulting in an enhancement of processing speed of the total halftone processing, which is preferable.

Halftone processing in the variation of the second embodiment will be explained as follows, referring to the flow chart in FIG. 13.

First, target pixel selection means 2 shown in FIG. 9 (a target pixel selection function of an image forming program) conducts a target pixel selection process to select pixels one by one by conducting scanning in the regular direction or meandering scanning (illustration omitted).

Figure 13:
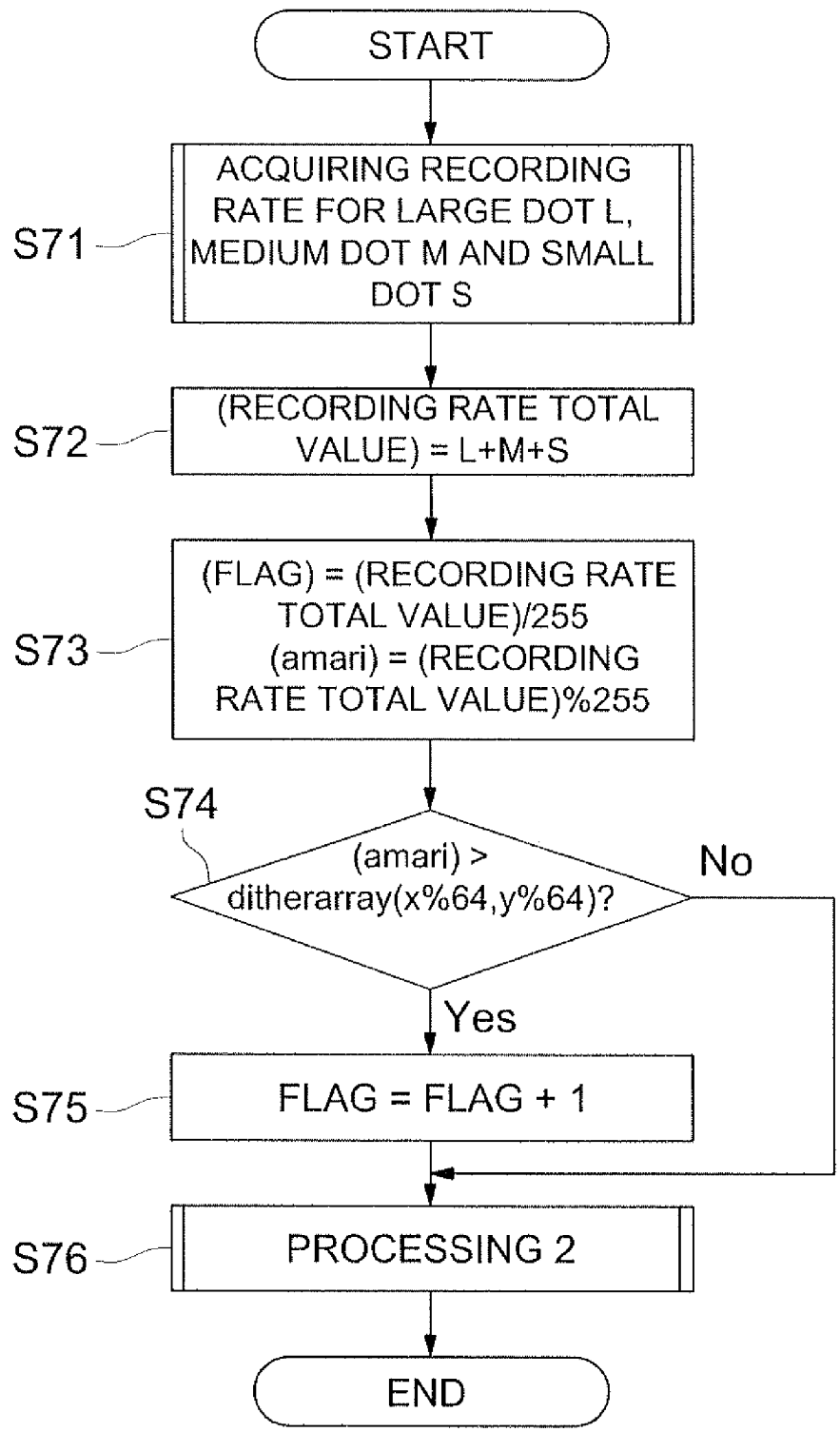
FIG. 13 is a flow chart showing halftone processing in a variation of the second embodiment.

Next, recording rate acquisition means 3 shown in FIG. 9 (recording rate acquisition function of the image forming program) conducts a recording rate acquisition process for acquiring recording rate S for large dot recording rate L, medium dot recording rate M and small dot recording rate S as shown in FIG. 13 by using a degradation table shown in FIG. 12, for example, for each of CMYK colors in input pixels (step S71) and for acquiring recording rate total value L+M+S (step S72).

Next, first quantization means 4 shown in FIG. 9 (first quantization function of the image forming program) conducts the first quantization process. In this first quantization process in the second embodiment, a dither method is used.

First, the quotient of a value obtained by dividing recording rate total value L+M+S ($0 \leq$ L+M+S $\leq 765$) obtained in step S72, namely, an integer portion ($0 \leq$ integer portion $\leq 3$) is substituted for FLAG, and a remainder portion ($0 \leq$ remainder portion $\leq 254$) of a value obtained by dividing recording rate total value L+M+S ($0 \leq$ L+M+S $\leq 765$) by 255 is substituted for amari (step S73).

Next, amari is compared with value ditherarray (X%64, Y%64) at the position of dither matrix shown in FIG. 14, to judge whether the amari is greater or smaller than the ditherarray (X%64, Y%64) (step S74). Incidentally, "X%64" in the step S74 means "a remainder obtained by dividing X by 64", while, "Y%64" means "a remainder obtained by dividing Y by 64".

Figure 11:
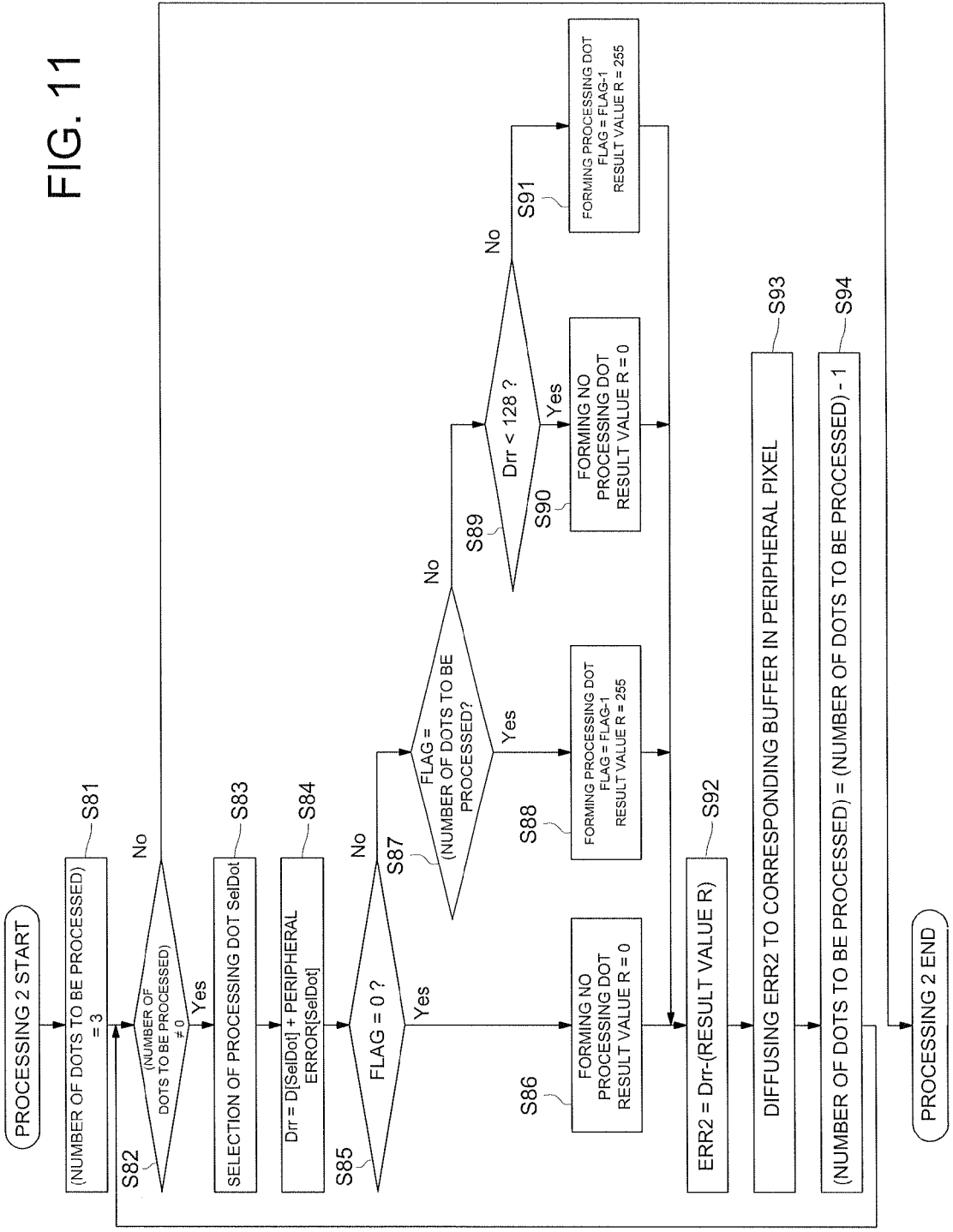
FIG. 11 is a flow chart showing halftone processing in the second embodiment.

When the amari is greater than the ditherarray (X%64, Y%64) in this case, 1 is added to FLAG (FLAG=FLAG+1) (step S75), and processing 2 shown in FIG. 11 is practiced in the same way as in the second embodiment (step S76). In contrast to this, when the amari is not greater than the ditherarray (X%64, Y%64), FLAG remains unchanged, and processing 2 shown in FIG. 11 is practiced (step S76).

Third Embodiment

Next, the third embodiment will be explained, referring to FIGS. 15 and 16.

In the present embodiment, there will be explained an image forming apparatus that is applied to an inkjet printer forming dots corresponding to four colors (four types) of ink, an image forming method and an image forming program. In the meantime, the third embodiment is the same as the aforesaid second embodiment, except for the point that halftone processing in the step S4 in the image forming method is the same as the processing shown in a flow chart in each of FIG. 15 and FIG. 16, and explanations for the same processing and the same structure will be omitted accordingly.

An image processing method in the third embodiment will be explained.

In the present embodiment, there is shown halftone processing in the case of an inkjet printer that forms dots corresponding to ink of four colors (CMYK). Meanwhile, explanation for processing and structure which are the same as those in the aforesaid second embodiment will be omitted.

Halftone processing in the image processing method of the third embodiment will be explained as follows, by the use of flow charts in FIGS. 15 and 16.

First, target pixel selection means 2 shown in FIG. 9 (target pixel selection function of an image forming program) conducts a target pixel selection process for selecting pixels one by one by conducting scanning in the regular direction or by conducting meandering scanning (illustration is omitted).

Figure 15:
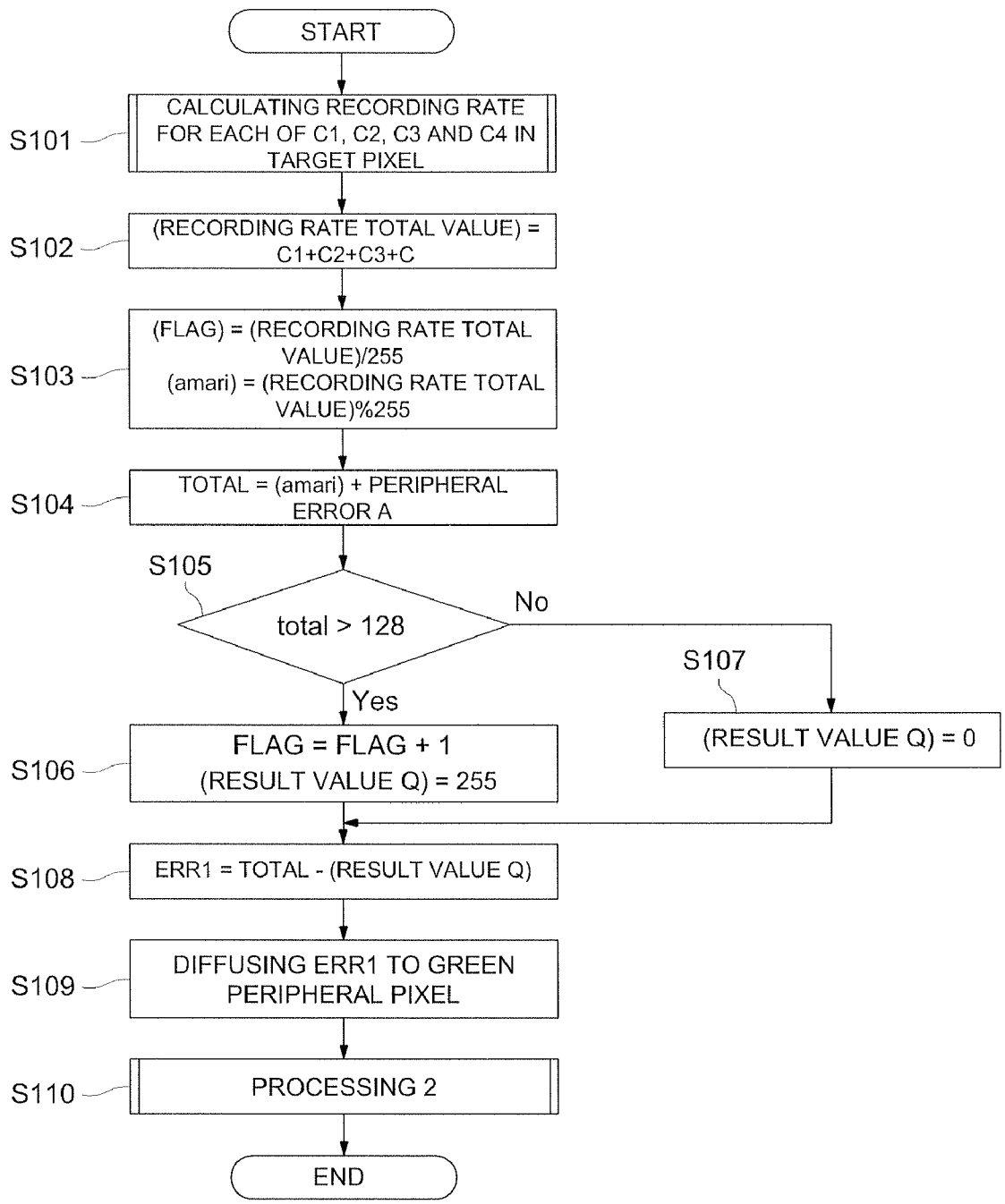
FIG. 15 is a flow chart showing halftone processing in the third embodiment.
Figure 16:
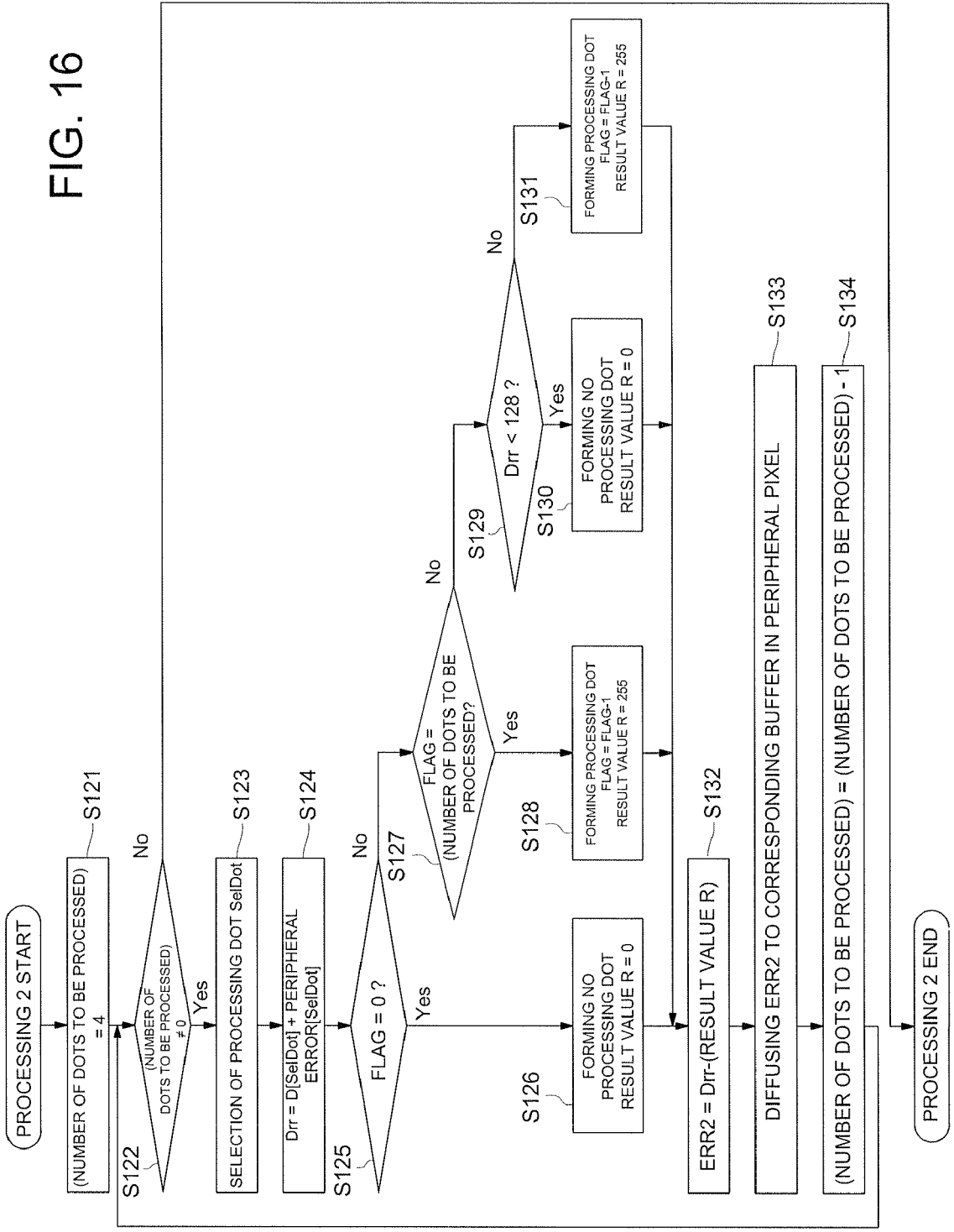
FIG. 16 is a flow chart showing halftone processing in the third embodiment.

Next, recording rate acquisition means 3 shown in FIG. 9 (recording rate acquisition function of the image forming program) conducts a recording rate acquisition process for acquiring recording rate C1 for C, recording rate C2 for M, recording rate C3 for Y and recording rate C4 for K as shown in FIG. 15, for respective colors of CMYK in input pixel values (step S101) and for acquiring recording rate total value C1+C2+C3+C4 (step S102).

Next, first quantization means 4 shown in FIG. 9 (first quantization function of the image processing program) conducts the first quantization process. In this first quantization process in the third embodiment, an error diffusion method is used.

First, the quotient of a value obtained by dividing recording rate total value C1+C2+C3+C4 ($0 \leq$ C1+C2+C3+C4 $\leq 1020$) obtained in step S102 by 255, namely, an integer portion ($0 \leq$ integer portion $\leq 4$) is substituted for FLAG, and a remainder portion ($0 \leq$ remainder portion $\leq 254$) of a value obtained by dividing recording rate total value C1+C2+C3+C4 ($0 \leq$ C1+C2+C3+C4 $\leq 1020$) by 255 is substituted for amari (step S103).

Next, peripheral error A for the total value is added to amari to make total (step S104), and a judgment is formed whether the total is greater or smaller than a prescribed value (which is 128 in this case) (step S105).

In this case, when the total is 128 or more, 255 is substituted for result value Q for the total, and 1 is added to FLAG (FLAG=FLAG+1) (step S106). In contrast to this, when the total is smaller than 128, the FLAG remains unchanged, and 0 is substituted for result value Q for the total (step S107).

Incidentally, an occasion of FLAG=4 is a case where four dots are recorded on the target pixel, namely, a case where dots in four types of CMYK are dotted in piles, an occasion of FLAG=3 is a case where three dots are recorded on the target pixel, namely, a case where dots in three types determined in the second quantization process described later among four types of CMYK are dotted in piles, an occasion of FLAG=2 is a case where two dots are recorded on the target pixel, namely, a case where dots in two types determined in the second quantization process described later among four types of CMYK are dotted in piles, an occasion of FLAG=1 is a case where one dot is recorded on the target pixel, namely, a case where any one dot determined in the second quantization process described later among four types of CMYK is dotted, and an occasion of FLAG=0 is a case where zero dot is recorded on the target pixel, namely, a case where no dot is formed.

In the aforesaid way, a judgment is formed concerning how many dots should be formed once for each pixel independently of dot hue, namely, concerning whether four dots should be recorded in piles in the present embodiment or not, or, whether three dots among CMYK should be recorded in piles, or whether two dots among CMYK should be recorded in piles, or whether any one dot among CMYK should be recorded or whether no dot should be formed.

After that, the result value Q is subtracted from the total to make ERR1 (step S108) and the ERR1 is diffused on unprocessed peripheral pixels (step S109). Then, processing 2 shown in FIG. 16 is practiced (step S110).

In the processing 2, target dot selection means 6 shown in FIG. 9 (target dot selection function of an image forming program) conducts a target dot selection process first.

In the target dot selection process, the number X of dots to be processed is defined (step S121). The number of dots to be processed means types of dots in the second quantization process, and it is synonymous with types of dots which can be acquired in the recording rate acquisition process. In the present embodiment, X=4 is substituted, because dots in four types of CMYK are processed.

Next, a judgment is formed whether or not the number X of dots to be processed defined in the step S121 is not zero (step S122). When the number X of dots to be processed is zero in this case, the processing 2 is terminated.

In contrast to this, when the number X of dots to be processed is not zero (1≦number X of dots to be processed≦4, in the present embodiment), process dots (target dots) SelDot to be processed in the second quantization process are selected (step S123). As the process dot SelDot, dots which have not been selected as process dots in target dots among the dots in four types of CMYK, are selected in the present embodiment. Further, if a selection is made, beginning with dots having higher visual influence, in other words, beginning with K dot having the lowest lightness in this case, it is possible to enhance effects to control granulation feeling of dots, which is advantageous.

Next, the second quantization process by second quantization means 5 (second quantization function of an image forming program) shown in FIG. 9 is carried out. In this third embodiment, an error diffusion method is also used even in the second quantization process, in the same way as in the first quantization process.

In this case, a peripheral error for the process dots is added to recording rate D [SelDot] of the process dot SelDot to make Drr (step S124), and a judgment is formed whether FLAG is made to be 0 for the pixel in the first quantization process or not (step S125). Incidentally, in the present embodiment, a target dot selection process, the second quantization process and the subtraction process are repeated for the number of times equivalent to the number of dots to be processed. In this case, respective processes are conducted with processing dots, beginning with K targets, next, C dots, next, M dots and finally, Y dots, and recording rate D of processing dots SelDot [SelDot] is the same as recording rate C4 for K dots, the same as recording rate C1 for C, the same as recording rate C2 for M dots and the same as recording rate C3 for Y dots. At this moment, in this case of FLAG=0, forming of no dot is determined, and 0 is substituted for result value R (step S126).

In contrast to this, when FLAG=0 does not hold, a judgment is formed whether FLAG represents the number X of dots to be processed or not for the pixel next (step S127). When FLAG represents the number X of dots to be processed in this case, forming of dots to be processed is determined, 1 is subtracted from FLAG (FLAG=FLAG−1) and 255 is substituted for result value R,(step S128).

When FLAG does not represent the number X of dots to be processed, a judgment is formed whether Drr is greater or smaller than 128 (step S129). When Drr is smaller than 128 in this case, it is determined that dots to be processed are not formed, and 0 is substituted for result value R (step S130).

In contrast to this, when Drr is 128 or more, it is determined that dots to be processed are recorded, 1 is subtracted from FLAG (FLAG=FLAG−1) and 255 is substituted for result value R (step S131).

After that, the aforesaid result value R is subtracted from Drr to make ERR2 (step S132), and the ERR2 is diffused on corresponding buffer of selected process dots on unprocessed peripheral pixels (step S133).

Then, subtraction process by subtraction means 7 (subtraction function of an image forming program) shown in FIG. 9 is practiced (step S134). In the subtraction process, 1 is subtracted from the number X of dots to be processed. After that, S122-S134 are repeated until the number X of dots to be processed is reduced to zero.

These processes are conducted for all pixels forming an image. At the point of time when processes in FIGS. 15 and 16 are completed for all pixels, halftone processing (step S4) in FIG. 2 is terminated.

Fourth Embodiment

Next, the third embodiment will be explained, referring to FIGS. 17 and 18.

In the present embodiment, there will be explained an image forming apparatus that is applied to an inkjet printer forming dots in two types of dark dot and light dot for ink of respective colors, an image forming method and an image forming program. In the meantime, the fourth embodiment is the same as the aforesaid first embodiment, except for the point that halftone processing in the step S4 in the image forming method is the same as the processing shown in a flow chart in each of FIG. 17 and FIG. 18, and explanations for the same processing and the same structure will be omitted accordingly.

In the present embodiment, a dither matrix of 64×64 is used as a dither matrix. If the dither matrix is a multiple of 2, amari in S73 or the like can be calculated simply, and processing speed is enhanced, resulting in an enhancement of processing speed of the total halftone processing, which is preferable.

Halftone processing in the fourth embodiment will be explained as follows, by the use of flow charts in FIGS. 17 and 18.

First, target pixel selection means 2 shown in FIG. 1 (target pixel selection function of an image forming program) conducts a target pixel selection process for selecting pixels one by one by conducting scanning in the regular direction or by conducting meandering scanning (illustration is omitted).

Figure 17:
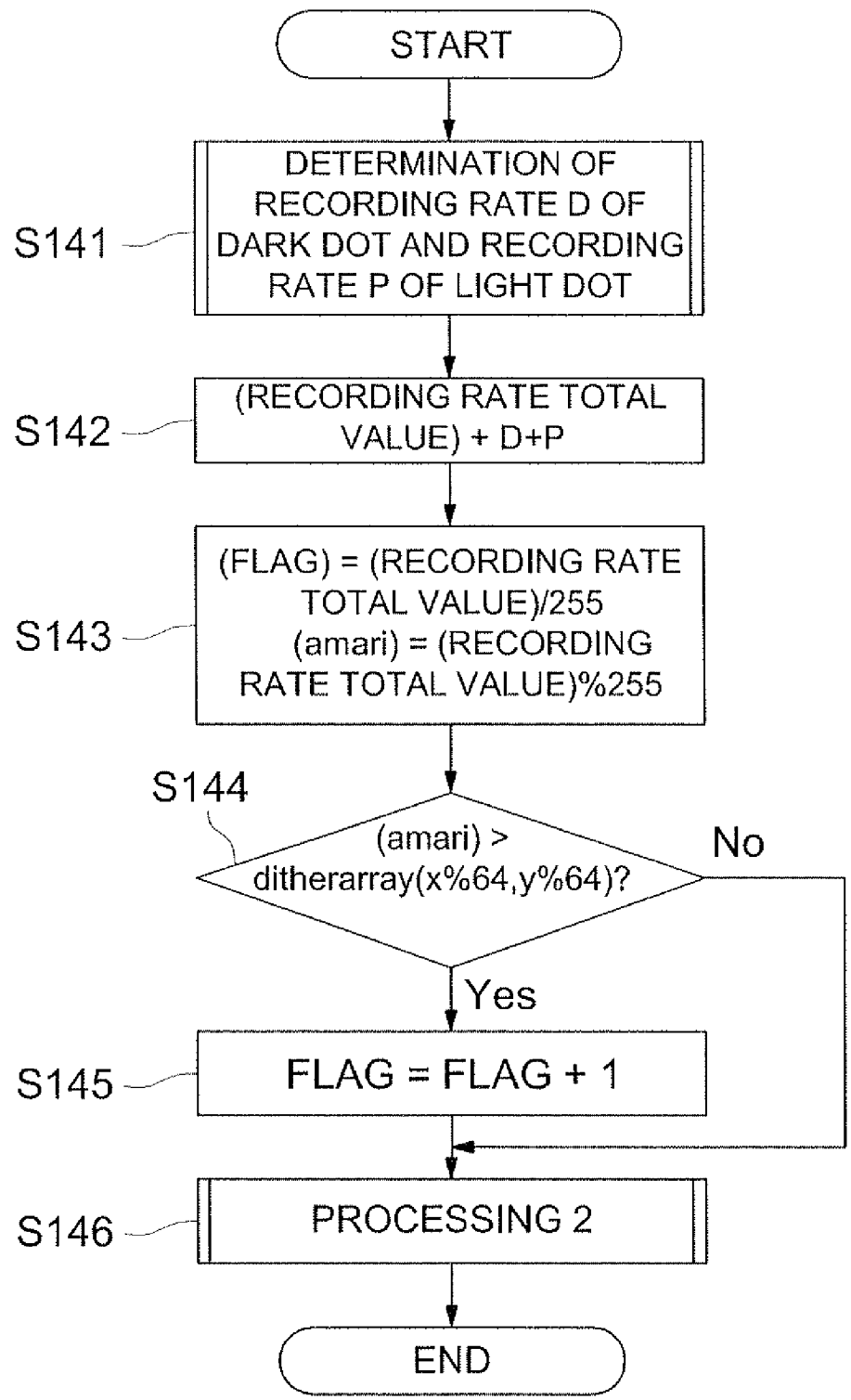
FIG. 17 is a flow chart showing halftone processing in the fourth embodiment.

Next, recording rate acquisition means 3 shown in FIG. 1 (recording rate acquisition function of the image forming program) conducts a recording rate acquisition process for acquiring recording rate D for the dark dot and recording rate P for the light dot as shown in FIG. 17, by the use of a degradation table shown in FIG. 5, for example, for respective colors of CMYK in input pixel values (step S141) and for acquiring recording rate total value D+P (step S142).

Next, first quantization means 4 shown in FIG. 1 (first quantization function of the image processing program) conducts the first quantization process. In this first quantization process in the fourth embodiment, a dither method is used.

First, the quotient of a value obtained by dividing recording rate total value D+P (0≦D+P≦510) obtained in step S142 by 255, namely, an integer portion (0≦integer portion≦2) is substituted for FLAG, and a remainder portion (0≦remainder portion≦254) of a value obtained by dividing recording rate total value D+P (0≦D+P≦510) by 255 is substituted for amari (step S143).

Next, amari is compared with value ditherarray (X%64, Y%64) at the position of dither matrix shown in FIG. 14, to judge whether the amari is greater or smaller than the ditherarray (X%64, Y%64) (step S144). Incidentally, "X%64" in the step S144 means "a remainder obtained by dividing X by 64", while, "Y%64" means "a remainder obtained by dividing Y by 64".

Figure 18:
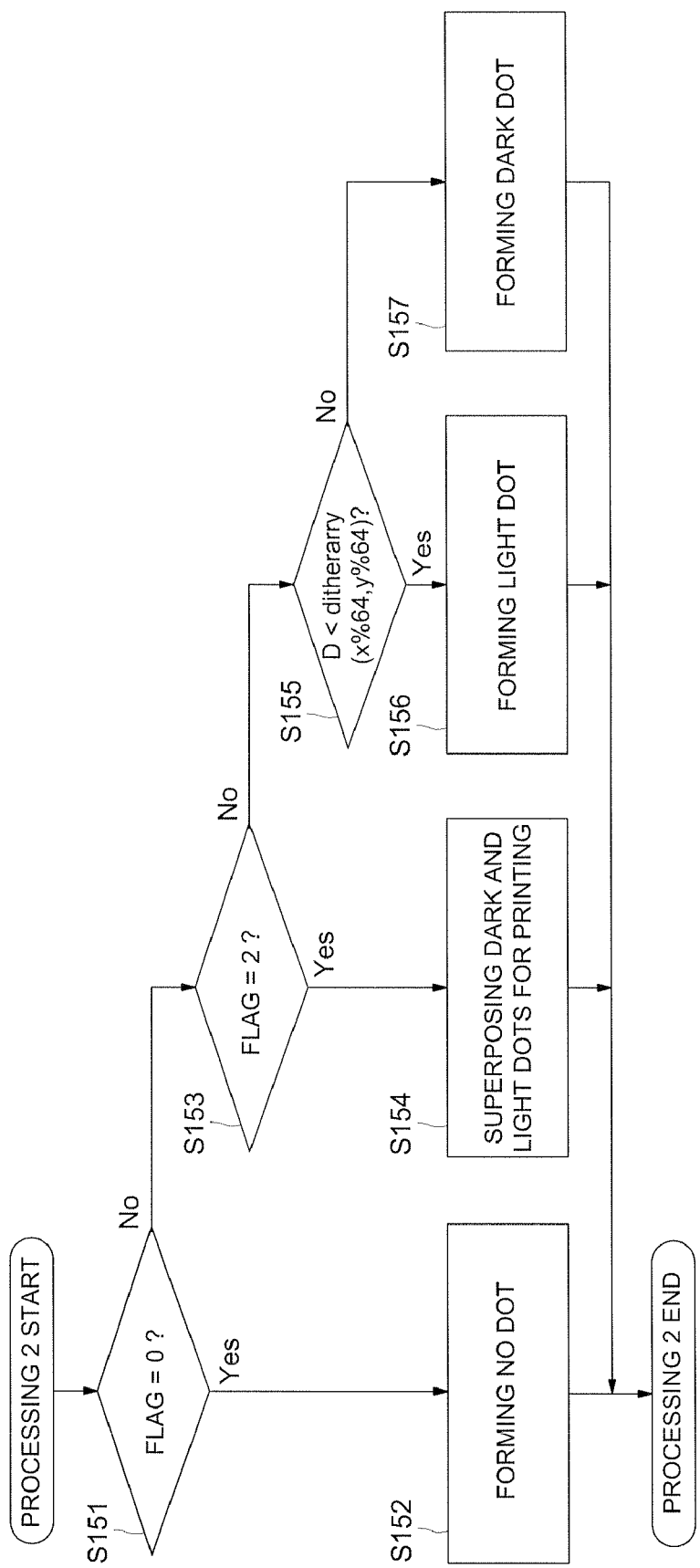
FIG. 18 is a flow chart showing halftone processing in the fourth embodiment.

When the amari is greater than the ditherarray (X%64, Y%64) in this case, 1 is added to FLAG (FLAG=FLAG+1) (step S145), and processing 2 shown in FIG. 18 is practiced (step S146). In contrast to this, when the amari is not greater than the ditherarray (X%64, Y%64), FLAG remains unchanged, and processing 2 shown in FIG. 18 is practiced (step S146).

In the meantime, as a result of the aforesaid processing, when FLAG=2 holds, it is an occasion wherein two dots are recorded on the target pixel, namely, an occasion wherein dots in two types including a dark dot and a light dot are dotted in piles, when FLAG=1 holds, it is an occasion wherein a single dot is recorded on the target pixel, namely, an occasion wherein either one of dark and light dots determined in the second quantization process described later is dotted, and when FLAG=0 holds, it is an occasion wherein zero dot is recorded on the target pixel, namely, an occasion wherein no dot is formed.

In the aforesaid way, a judgment is formed concerning how many dots should be formed once for each pixel, namely, concerning whether two dots should be recorded in piles in the present embodiment or not, or whether either one of dark and light dots should be recorded or not, or whether a dot should be formed or not, independently of a dark dot and a light dot and of a size of a dot.

In the processing 2, the second quantization process by second quantization means 5 shown in FIG. 1 (second quantization function of an image forming program) is carried out. In the fourth embodiment, a dither method is used even in the second quantization process.

In this case, a judgment is formed whether FLAG=0 holds in the first quantization process for the target pixel or not (step S151). When FLAG=0 holds in this case, it is determined that no dot is formed (step S152).

In contrast to this, when FLAG=0 does not hold, a judgment is formed next whether FLAG=2 holds in the first quantization process for the pixel or not (step S153). When FLAG=2 holds in this case, it is determined to dot a dark dot and a light dot in piles (step S154).

When FLAG=2 does not hold, a judgment is formed next whether recording rate D for the dark dot is greater or smaller than ditherarray (X%64, Y%64) (step S155), because of FLAG=1. When D is smaller than ditherarray (X%64, Y%64), it is determined to record only light dot (step S156).

In contrast to this, when D is not smaller than ditherarray (X%64, Y%64), it is determined to record only dark dot (step S157).

The processing of this kind is carried out on all of the pixels which form an image. At the point in time when processing in FIG. 17 and processing in FIG. 18 have been completed for all pixels, halftone processing in FIG. 2 (step S4) is terminated.

In the image forming apparatus of the fourth embodiment, by using the same threshold value for both the dither threshold value in the corresponding pixel position used in the first quantization and the dither threshold value in the corresponding pixel position used in the second quantization, it is possible to control interference between dithers and thereby to realize image quality that is higher than that in the case of using different dither threshold values.

As stated above, in the image forming apparatus of each embodiment mentioned above, there are provided a target pixel selection means that selects a target pixel, a recording rate acquisition means that acquires a recording rate total value of dots in $\beta$ types ($\beta$ is an integer satisfying $2 \leq \beta \leq \alpha$) among dots in $\alpha$ types and a recording rate for each of dots in ($\beta-1$) types, the first quantization means that conducts quantization based on the aforesaid recording rate total value and determines recording of dots in quantity of i (i is an integer satisfying $0 \leq i \leq \beta$) on the aforesaid target pixel, a target dot selection means that selects a target dot which has not been selected from dots in X types (initial value of X is X=$\beta$), the second quantization means that determines whether to record the target dot on the target pixel or not, based on the number i for dots to be recorded on the target pixel determined by the first quantization function and on the recording rate of the target dot, and a subtraction means that calculates X by subtracting the number of target dots selected from the dots in $\beta$ types, in the image forming apparatus capable of forming dots in $\alpha$ types ($\alpha$ is an integer satisfying $\alpha \geq 2$), and processes by the aforesaid target dot selection means, the second quantization means and a subtraction means are repeated until X is reduced to zero in the aforesaid subtraction means, whereby, granulation feeling caused by random overlapping between arranged dots can be reduced. Further, when the total printing rate for these dots exceeds 100%, in other words, even under the condition that dots are overlapped, the overlapped dots can be selected under the excellent dispersion, thus, visual granulation feeling can be controlled. Further, since a common halftone means is used for both an occasion where the total printing rate of dots exceeds 100% and an occasion where the total printing rate of dots does not exceed 100% in the first quantization means, a boundary line between 100% or more and 100% or less is not observed even when dots of one type only are observed, resulting in acquisition of smooth images which are free from pseudo-contours.

Further, in each embodiment, its effects are exhibited, even when the aforesaid dots in $\beta$ types are those each being different in terms of density, or when the aforesaid dots are those each being different in terms of a dot diameter on a recording medium, or when the aforesaid dots are those each being different in terms of hue. Namely, it is possible to control uneven density between dots each being different in terms of density or in terms of a dot diameter, and it is further possible to control uneven color difference between dots each being different in terms of hue.

In the image forming apparatus of each of the first and fourth embodiments, there are provided, in the image forming apparatus capable of forming dots in $\alpha$ types ($\alpha$ is an integer satisfying $\alpha \geq 2$), a target pixel selection means that selects a target pixel, a recording rate acquisition means that acquires a recording rate total value of dots in 2 types among dots in $\alpha$ types and a recording rate for a dot on one side among dots in 2 types, the first quantization means that conducts quantization based on the aforesaid recording rate total value and determines recording of dots in quantity of i (i is an integer satisfying $0 \leq i \leq 2$) on the aforesaid target pixel, and second quantization means that determines types of dots to be recorded on the target pixel based on the number i of dots to be recorded on the target pixel determined by the first quantization means and on the recording rate of the dot on one side, whereby, granulation feeling caused by random overlapping between arranged dots can be reduced. Further, when the total printing rate for these dots exceeds 100%, in other words, even under the condition that dots are overlapped, the overlapped dots can be selected under the excellent dispersion, thus, visual granulation feeling can be controlled. Further, since a common halftone means is used for both an occasion where the total printing rate of dots exceeds 100% and an occasion where the total printing rate of dots does not exceed 100% in the first quantization means, a boundary line between 100% or more and 100% or less is not observed even when dots of one type only are observed, resulting in acquisition of smooth images which are free from pseudo-contours. When conducting quantization for dots in two types among dots in α types as in the first embodiment, it is possible to conduct quantization in a simpler processing than in quantization for dots in 3 types or more among dots in α types, and thereby, to improve processing speed and to lighten processing load for the apparatus.

Further, in each of the first and fourth embodiments, its effects are exhibited, even when the aforesaid dots in 2 types are those which are different in terms of density each other, or those which are different in terms of a dot diameter on a recording medium each other, or those which are different in terms of hue. Namely, it is possible to control uneven density between dots each being different in terms of density or in terms of a dot diameter, and it is further possible to control uneven color difference between dots each being different in terms of hue.

In each of the second and third embodiments, the target dot selection means selects, beginning with dots having higher visual influence. Therefore, selection is made, beginning with dots having higher visual influence, in other words, beginning with remarkable dots, thus, dispersibility of the dots can be secured, and images with less granulation feeling can be obtained.

Further, in each embodiment (excluding a variation of the second example and the fourth embodiment), the aforesaid first quantization means conducts quantization through an error diffusion method wherein an error caused by the first quantization on the processed peripheral pixel is reflected on the recording rate total value corresponding to the target pixel, and thereby diffuses errors caused by the aforesaid quantization on unprocessed peripheral pixels, thus, dispersion of total dots is made to be excellent by using the error diffusion method for the processing by the first quantization means.

Furthermore, in each of the second and fourth embodiments, the aforesaid first quantization means quantizes in a dithering method in which the recording rate total value on the target pixel is compared with a dither matrix value corresponding to the target pixel, whereby the dithering method makes it possible for the first quantization means to conduct processing at high speed.

Further, in each embodiment (excluding the fourth embodiment), the aforesaid second quantization means quantizes in an error diffusion method in which an error on the processed peripheral pixel generated by the second quantization is reflected on the recording rate of the target dot, thus, errors generated by the quantization are diffused on unprocessed peripheral pixels, whereby processing of the second quantization conducted by the error diffusion method makes it possible to select dot positions under excellent dispersion.

As shown in each embodiment, there are various patterns in each of the first quantization and the second quantization, including a pattern to use a dither method and a pattern to use an error diffusion method. Therefore, it is possible to conduct halftone processing through their optional combination, corresponding to various conditions.

Owing to the foregoing, it is possible to improve dot dispersion and thereby to form images with high image quality.

In addition, the same effects as in those of the aforesaid image forming apparatus can be exhibited also by the image forming method and the image forming program of the present embodiment.

In the meantime, the invention is not limited to the aforesaid embodiments, and various modifications and design changes may be made by a skilled person without departing from the spirit and scope of the invention.

For example, output values and result values in each embodiment stated above can be changed depending on the number of bits and the number quantization gradation to be processed. The output values are dependent on the output system. For example, quantization for 5 level halftoning or more is allowed.

What is claimed is:

1. An image forming apparatus capable of forming dots in α types (α is an integer satisfying α≧2), comprising:
   a target pixel selection device that selects a target pixel;
   a recording rate acquisition device that acquires a recording rate total value of dots in β types (β is an integer satisfying 2≦β≦α) among dots in α types and a recording rate for each of dots in (β−1) types;
   a first quantization device that conducts quantization based on the recording rate total value and determines recording of dots in quantity of i (i is an integer satisfying 0≦i≦β) on the target pixel;
   a target dot selection device that selects a target dot which has not been selected from dots in X types (initial value of X is X =β);
   a second quantization device that determines whether to record the target dot on the target pixel or not, based on the number i for dots to be recorded on the target pixel determined by the first quantization device and on the recording rate of the target dot; and
   a subtraction device that calculates X by subtracting the number of target dots selected from the dots in β types, wherein processes by the target dot selection device, the second quantization device and the subtraction device are repeated until X is reduced to zero in the subtraction device.

2. The image forming apparatus of claim 1, wherein the dots in β types are those each being different in terms of density.

3. The image forming apparatus of claim 1, wherein the dots in β types are those each being different in terms of a dot diameter on a recording medium.

4. The image forming apparatus of claim 1, wherein the dots in β types are those each being different in terms of a hue each other.

5. The image forming apparatus of claim 1, wherein the target dot selection device selects, beginning with dots having higher visual influence.

6. The image forming apparatus of claim 1, wherein the first quantization device quantizes in a dithering method in which a remainder portion (0≦ remainder portion ≦254) of a value obtained by dividing the recording rate total value by 255 on the target pixel is compared with a dither matrix value corresponding to the target pixel.

7. The image forming apparatus of claim 1, wherein the first quantization device conducts quantization through an error diffusion method wherein an error caused by the first quantization on the processed peripheral pixel is reflected on the recording rate total value corresponding to the target value, and diffuses errors caused by the quantization on unprocessed peripheral pixels.

8. The image forming apparatus of claim 1, wherein the second quantization device conducts quantization through an error diffusion method wherein an error caused by the second quantization on the processed peripheral pixel is reflected on the recording rate of the corresponding target dot, and diffuses errors caused by the quantization on unprocessed peripheral pixels.

9. The image forming apparatus of claim 1, wherein the recording rate acquisition device transforms an input pixel value by using a prescribed degradation table to acquire the recording rate total value and the recording rate of not less than 1.

10. The image forming apparatus of claim 1, wherein respective recording rates corresponding to pixel values are preserved in advance in the recording rate acquisition device.

11. An image forming apparatus capable of forming dots in α types (α is an integer satisfying α≧2), comprising:
   a target pixel selection device that selects a target pixel;
   a recording rate acquisition device that acquires a recording rate total value of dots in two types among dots in α types and a recording rate for either one of the two types dots;
   a first quantization device that conducts quantization based on the recording rate total value and determines recording of dots in quantity of i (i is an integer satisfying 0≦i≦2) on the aforesaid target pixel; and
   a second quantization device that determines a type of the dot to be recorded on the target pixel, based on quantity i of dots recorded on the target pixel determined by the first quantization device and on the recording rate for either one of the two types dots.

12. The image forming apparatus of claim 11, wherein the dots in two types are those which are different in terms of density each other.

13. The image forming apparatus of claim 11, wherein the dots in two types are those which are different in terms of a dot diameter on a recording medium each other.

14. The image forming apparatus of claim 11, wherein the dots in two types are those which are different in terms of a hue each other.

15. The image forming apparatus of claim 11, wherein the first quantization device quantizes in a dithering method in which a remainder portion (0≦ remainder portion 254) of a value obtained by dividing the recording rate total value by 255 on the target pixel is compared with a dither matrix value corresponding to the target pixel.

16. The image forming apparatus of claim 11, wherein the first quantization device conducts quantization through an error diffusion method wherein an error caused by the first quantization on the processed peripheral pixel is reflected on the recording rate total value corresponding to the target value, and diffuses errors caused by the quantization on unprocessed peripheral pixels.

17. The image forming apparatus of claim 11, wherein the second quantization device conducts quantization through an error diffusion method wherein an error caused by the second quantization on the processed peripheral pixel is reflected on the recording rate of the corresponding target dot, and diffuses errors caused by the quantization on unprocessed peripheral pixels.

18. The image forming apparatus of claim 11, wherein the recording rate acquisition device transforms an input pixel value by using a prescribed degradation table to acquire the recording rate total value and the recording rate of not less than 1.

19. The image forming apparatus of claim 11, wherein respective recording rates corresponding to pixel values are preserved in advance in the recording rate acquisition device.

20. An image forming method capable of forming dots in α types (α is an integer satisfying α≧2), comprising:
   a target pixel selection process that selects a target pixel;
   a recording rate acquisition process that acquires a recording rate total value of dots in β types (β is an integer satisfying 2≦β≦α) among dots in α types and a recording rate for each of dots in (β−1) types;
   a first quantization process that conducts quantization based on the aforesaid recording rate total value and determines recording of dots in quantity of i (i is an integer satisfying 0≦i≦β) on the aforesaid target pixel;
   a target dot selection process that selects a target dot which has not been selected from dots in X types (initial value of X is X=β);
   a second quantization process that determines whether to record the target dot on the target pixel or not, based on the number i for dots to be recorded on the target pixel determined by the first quantization process and on the recording rate of the target dot; and
   a subtraction process that calculates X by subtracting the number of target dots selected from the dots in β types, wherein, processes by the target dot selection process, the second quantization process and the subtraction process are repeated until X is reduced to zero in the subtraction process.

21. The image forming method of claim 20, wherein the dots in β types are those each being different in terms of density.

22. The image forming method of claim 20, wherein the dots in β types are those each being different in terms of a dot diameter on a recording medium.

23. The image forming method of claim 20, wherein the dots in β types are those each being different in terms of the hue.

24. The image forming method of claim 20, wherein target dots are selected, beginning with dots having higher visual influence, in the target dot selection process.

25. The image forming method of claim 20, wherein the first quantization process quantizes in a dithering method in which a remainder portion (0≦ remainder portion ≦254) of a value obtained by dividing the recording rate total value by 255 on the target pixel is compared with a dither matrix value corresponding to the target pixel.

26. The image forming method of claim 20, wherein the first quantization process conducts quantization through an error diffusion method wherein an error caused by the first quantization on the processed peripheral pixel is reflected on the recording rate total value corresponding to the target pixel, and diffuses errors caused by the quantization on unprocessed peripheral pixels.

27. The Image forming method of claim 20, wherein the second quantization process conducts quantization through an error diffusion method wherein an error caused by the second quantization on the processed peripheral pixel is reflected on the recording rate of the corresponding target dot, and diffuses errors caused by the quantization on unprocessed peripheral pixels.

28. The image forming method of claim 20, wherein an input pixel value is transformed by using a prescribed degradation table in the recording rate acquisition process, to acquire the recording rate total value and the recording rate of not less than 1.

29. The image forming method of claim 20, wherein respective recording rates corresponding to pixel values are preserved in advance in the recording rate acquisition process.

30. An image forming method capable of forming dots in α types (α is an integer satisfying α≧2), comprising:

a target pixel selection process that selects a target pixel;

a recording rate acquisition process that acquires a recording rate total value of dots in two types among dots in $\alpha$ types and a recording rate for either one of the two types dots;

a first quantization process that conducts quantization based on the recording rate total value and determines recording of dots in quantity of i (i is an integer satisfying $0 \leq i \leq 2$) on the target pixel, and a second quantization process that determines a type of the dot to be recorded on the target pixel, based on quantity i of dots recorded on the target pixel determined in the first quantization process and on the recording rate for either one of the two types dots.

31. The image forming method of claim 30, wherein the dots in two types are those which are different in terms of density each other.

32. The image forming method of claim 30, wherein the dots in two types are those which are different in terms of a dot diameter on a recording medium each other.

33. The image forming method of claim 30, wherein the dots in two types are those which are different in terms of the hue each other.

34. The image forming method of claim 30, wherein the first quantization process quantizes in a dithering method in which the recording rate total value on the target pixel is compared with a dither matrix value corresponding to the target pixel.

35. The image forming method of claim 30. wherein the first quantization process conducts quantization through an error diffusion method wherein an error caused by the first quantization on the processed peripheral pixel is reflected on the recording rate total value corresponding to the target pixel, and diffuses errors caused by the quantization on unprocessed peripheral pixels.

36. The image forming method of claim 30, wherein the second quantization process conducts quantization through an error diffusion method wherein an error caused by the second quantization on the processed peripheral pixel is reflected on the recording rate of the corresponding target dot, and diffuses errors caused by the quantization on unprocessed peripheral pixels.

37. The image forming method of claim 30, wherein an input pixel value is transformed by using a prescribed degradation table in the recording rate acquisition process, to acquire the recording rate total value and the recording rate of not less than 1.

38. The image forming method of claim 30, wherein respective recording rates corresponding to pixel values are preserved in advance in the recording rate acquisition process.

* * * * *